US011532974B2

(12) United States Patent
Hidaka et al.

(10) Patent No.: US 11,532,974 B2
(45) Date of Patent: Dec. 20, 2022

(54) ELECTRIC ROTATING MACHINE

(71) Applicant: Mitsubishi Electric Corporation, Tokyo (JP)

(72) Inventors: Yuki Hidaka, Tokyo (JP); Toshiyuki Yoshizawa, Tokyo (JP); Naohide Maeda, Tokyo (JP); Tadashi Murakami, Tokyo (JP); Hiroyuki Higashino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 9 days.

(21) Appl. No.: 17/087,998

(22) Filed: Nov. 3, 2020

(65) Prior Publication Data
US 2021/0184519 A1    Jun. 17, 2021

(30) Foreign Application Priority Data
Dec. 13, 2019   (JP) .............................. JP2019-225040

(51) Int. Cl.
*H02K 1/24*    (2006.01)
*H02K 21/04*   (2006.01)
*H02K 1/276*   (2022.01)

(52) U.S. Cl.
CPC ........... *H02K 21/044* (2013.01); *H02K 1/243* (2013.01); *H02K 1/2766* (2013.01); *H02K 21/04* (2013.01)

(58) Field of Classification Search
CPC ............ H02K 1/00; H02K 1/24; H02K 1/243; H02K 1/27; H02K 1/2766; H02K 21/00;
(Continued)

(56) References Cited

U.S. PATENT DOCUMENTS

| 5,270,605 A * | 12/1993 | Lefrancois | ............. H02K 1/243 310/263 |
| 2002/0047487 A1* | 4/2002 | Ikeda | ..................... H02K 1/243 310/263 |

(Continued)

FOREIGN PATENT DOCUMENTS

JP        11-98787 A     4/1999

*Primary Examiner* — Tran N Nguyen
(74) *Attorney, Agent, or Firm* — Sughrue Mion, PLLC; Richard C. Turner

(57) ABSTRACT

In order to obtain an electric rotating machine which can improve rotating machine efficiency by suppressing a harmonic component of rotor magnetomotive force and reducing harmonic core loss, a permanent magnet is furnished in some of inter-magnetic pole portions, the inter-magnetic pole portion being formed between a first claw-shaped magnetic pole portion and a second claw-shaped magnetic pole portion; the shapes of a first chamfered portion and a second chamfered portion, which are provided in the inter-magnetic pole portion where the permanent magnet is inserted, differ from those of a first chamfered portion and a second chamfered portion, which are provided in an inter-magnetic pole portion where the permanent magnet is not inserted; and/or the shapes of a first magnetic flux adjusting portion and a second magnetic flux adjusting portion, which are provided in the inter-magnetic pole portion where the permanent magnet is inserted, differ from those of a first magnetic flux adjusting portion and a second magnetic flux adjusting portion, which are provided in the inter-magnetic pole portion where the permanent magnet is not inserted.

15 Claims, 13 Drawing Sheets

(58) Field of Classification Search
CPC ...... H02K 21/04; H02K 21/044; H02K 11/00; H02K 11/05; H02K 9/00; H02K 9/06; H02K 19/00; H02K 19/22
See application file for complete search history.

(56) References Cited

U.S. PATENT DOCUMENTS

2003/0137214 A1* 7/2003 Ishizuka ................ H02K 1/243
310/263
2010/0026130 A1* 2/2010 Kondo ................ H02K 21/044
310/181

* cited by examiner

ELECTRIC ROTATING MACHINE

BACKGROUND OF THE INVENTION

1. Field of the Invention

The present application relates to an electric rotating machine having a rotor constituted by claw-shaped magnetic pole portions.

2. Description of the Related Art

In an electric rotating machine, a rotor arranged with a constant gap on the inner circumferential side of a stator magnetic pole includes: a plurality of pairs of claw-type magnetic poles arranged in face-to-face relation, the claw-type magnetic poles being integrally mounted on a shaft and each pair of the claw-type magnetic poles being formed with a claw portion having an N pole and a claw portion having an S pole at each top portion; a field winding (rotor winding) that generates magnetization force in the claw-type magnetic poles; and a permanent magnet alternately arranged between the claw portions of the claw-type magnetic poles arranged in face-to-face relation. A distance L1 between the claw portions of the claw-type magnetic poles arranged face-to-face relation where the permanent magnet is arranged is made narrower than a distance L2 between the claw portions of the claw-type magnetic poles arranged in face-to-face relation where the permanent magnet is not arranged (for example, see Patent Document 1).

Patent Document 1: JP-A-H11(1999)-98787

In the prior art described in Patent Document 1, the amount of rotor magnetomotive force is different between an inter-magnetic pole portion where the permanent magnet is inserted and an inter-magnetic pole portion where the permanent magnet is not inserted and accordingly a harmonic component of the rotor magnetomotive force is increased and rotating machine efficiency is reduced due to an increase in harmonic core loss.

BRIEF SUMMARY OF THE INVENTION

The present application is implemented to solve the foregoing problem, and an object of the present application is to provide an electric rotating machine which can improve rotating machine efficiency by suppressing a harmonic component of rotor magnetomotive force and reducing harmonic core loss.

The electric rotating machine disclosed in the present application is an electric rotating machine which includes: a rotor; and a stator configured to be arranged via an air gap with respect to the outer circumference of the rotor; the rotor being configured to have a rotor winding, and a pole core body which is constituted by combining a first pole with a second pole and in which the rotor winding is arranged in an internal space formed by the first pole and the second pole; the first pole being configured to have a plurality of first claw-shaped magnetic pole portions arranged with a space in the rotation direction of the rotor; the second pole being configured to have a plurality of second claw-shaped magnetic pole portions arranged with a space in the rotation direction of the rotor; the first claw-shaped magnetic pole portion and the second claw-shaped magnetic pole portion being configured to be furnished with a permanent magnet in some of inter-magnetic pole portions, the inter-magnetic pole portion being formed between the first and second claw-shaped magnetic pole portions; and the first pole and the second pole being configured to be combined so that the first claw-shaped magnetic pole portion and the second claw-shaped magnetic pole portion are alternately engaged; the electric rotating machine including: first magnetic flux adjusting portions configured to be provided on both side surfaces in the rotation direction of the first claw-shaped magnetic pole portion to reduce the distance between the first claw-shaped magnetic pole portion and the second claw-shaped magnetic pole portion; second magnetic flux adjusting portions configured to be provided on both side surfaces in the rotation direction of the second claw-shaped magnetic pole portion to reduce the distance between the claw-shaped magnetic pole portion and the second claw-shaped magnetic pole portion; a pair of first chamfered portions configured to be provided on both end sides in the rotation direction on the stator side surface of the first claw-shaped magnetic pole portion; and a pair of second chamfered portions configured to be provided on both end sides in the rotation direction on the stator side surface of the second claw-shaped magnetic pole portion. In the electric rotating machine, the shapes of the first chamfered portion and the second chamfered portion, which are adjacent to the inter-magnetic pole portion where the permanent magnet is inserted, are configured to be different from those of the first chamfered portion and the second chamfered portion, which are adjacent to an inter-magnetic pole portion (22b) where the permanent magnet (23) is not inserted; and/or the shapes of the first magnetic flux adjusting portion and the second magnetic flux adjusting portion, which are adjacent to the inter-magnetic pole portion where the permanent magnet is inserted, are configured to be different from those of the first magnetic flux adjusting portion and the second magnetic flux adjusting portion, which are adjacent to the inter-magnetic pole portion where the permanent magnet is not inserted.

According to the rotor of the electric rotating machine disclosed in the present application, the structure of the chamfered portion and/or the magnetic flux adjusting portion between the inter-magnetic pole portion where the permanent magnet is inserted and the inter-magnetic pole portion where the permanent magnet is not inserted, is different, whereby a rotor magnetomotive force waveform can be made a symmetric waveform, a harmonic component of the rotor magnetomotive force is suppressed, and harmonic core loss is reduced; therefore, there can be obtained a function that improves rotating machine efficiency.

The foregoing and other object, features, aspects, and advantages of the present application will become more apparent from the following detailed description of the present application when taken in conjunction with the accompanying drawings.

DETAILED DESCRIPTION OF THE INVENTION

Hereinafter, embodiments of an electric rotating machine according to the present application will be described on the basis of drawings. The respective drawings show elements necessary for explaining the embodiments and actually all the elements are not necessarily shown. In the case of referring to directions such as top and bottom or left and right, the directions are based descriptions of the drawings. The wording "fix" is optional if an object can be fixed and its fixing method does not matter. The wording "equal" means the same or substantially the same and, if different within a range of dimensional tolerance, a belonging function is regarded as the same.

Embodiment 1

Figure 1:
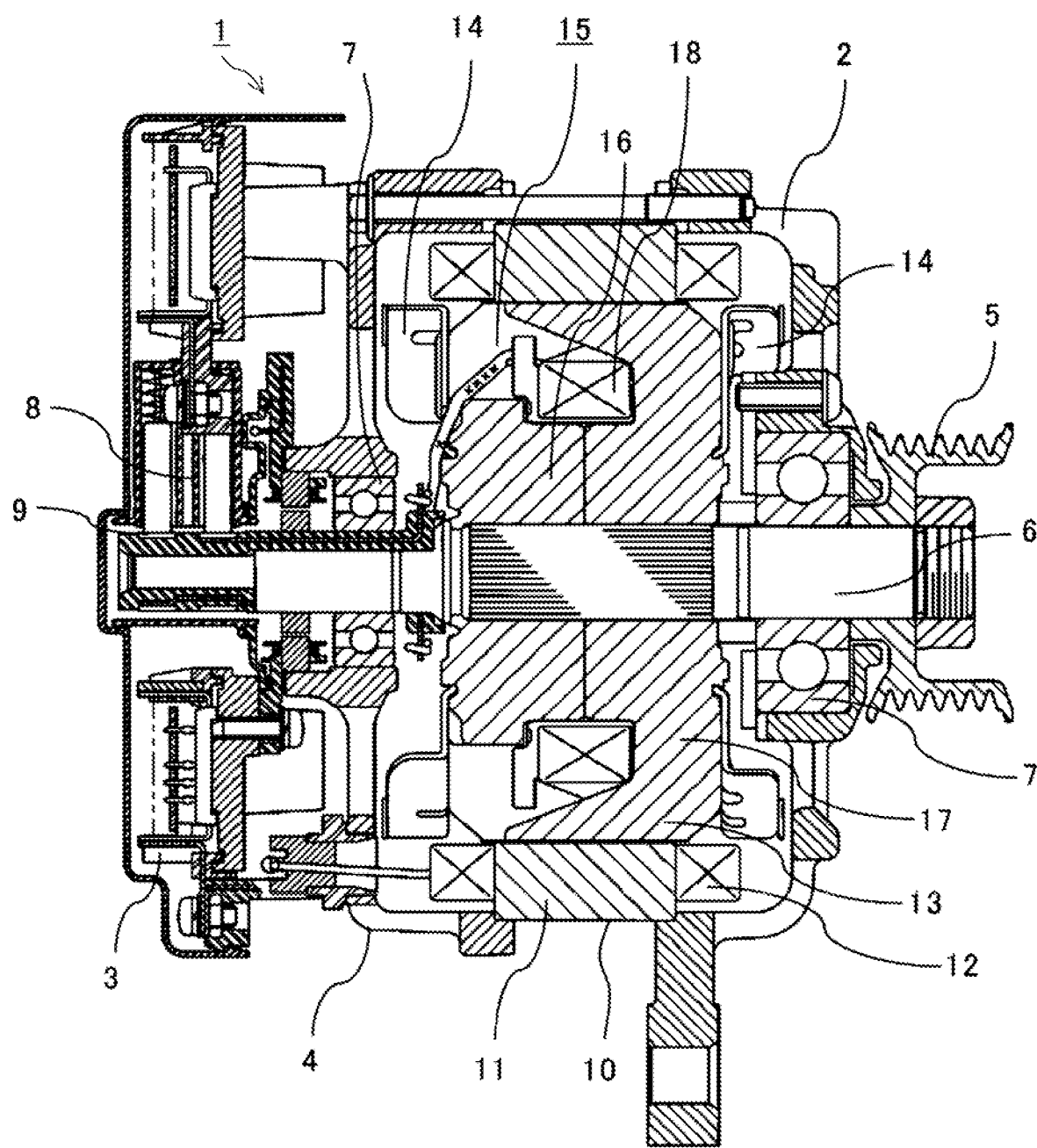
FIG. 1 is a sectional view of an electric rotating machine according to Embodiment 1.
Figure 2:
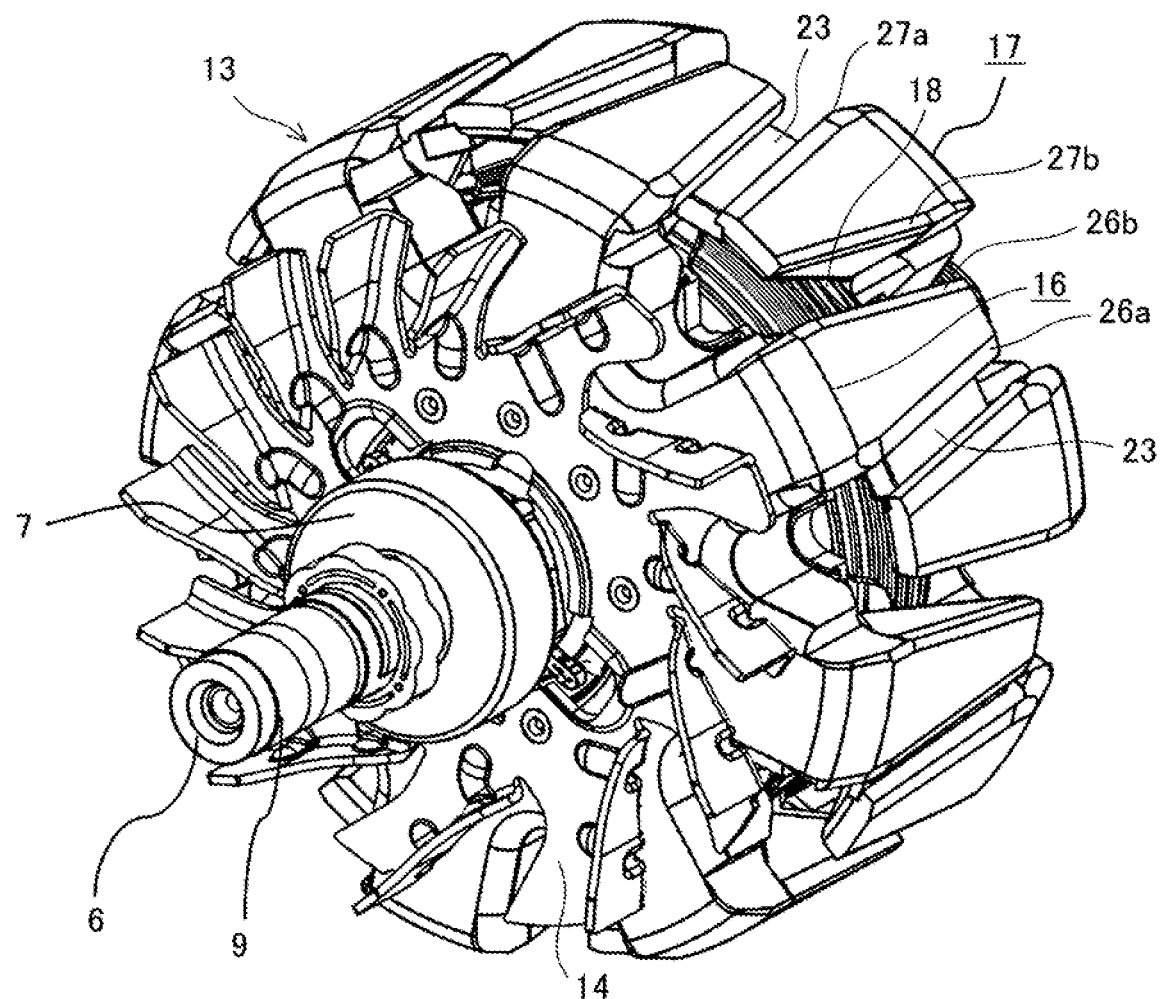
FIG. 2 is an overview view of a rotor of the electric rotating machine according to Embodiment 1.
Figure 3:
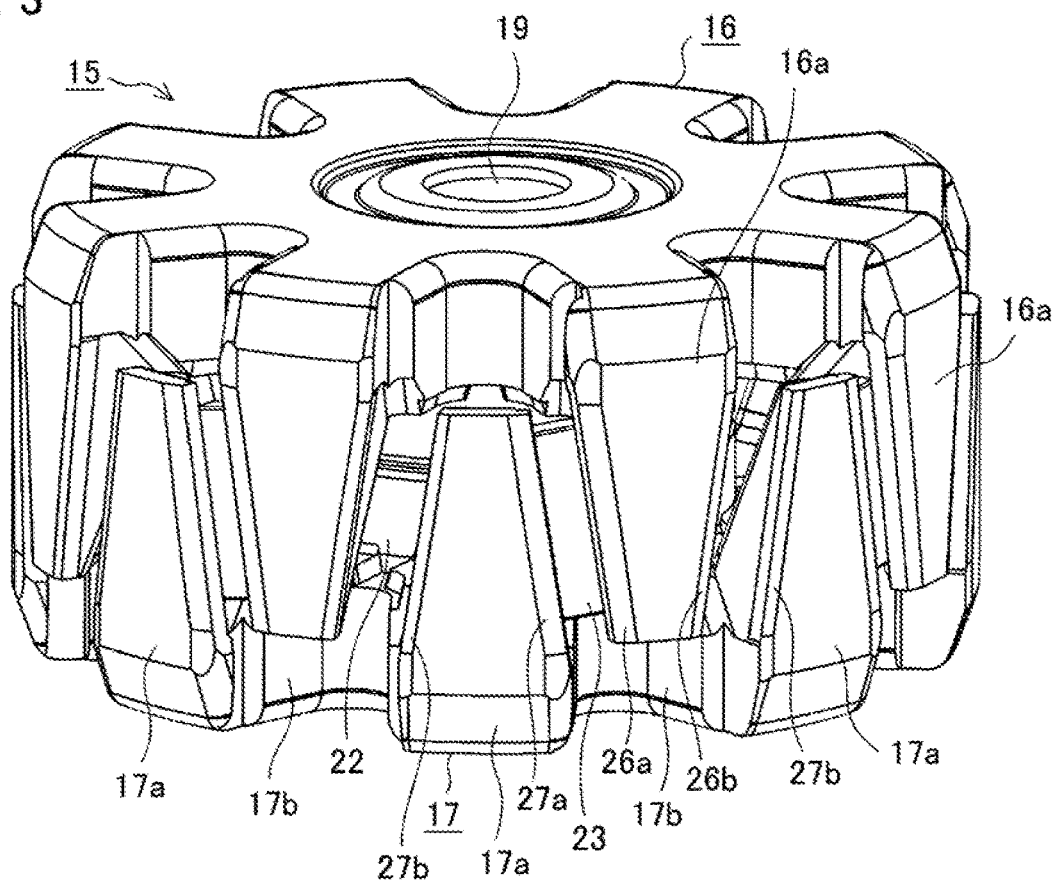
FIG. 3 is an overview view of a pole core body of the electric rotating machine according to Embodiment 1.
Figure 4:
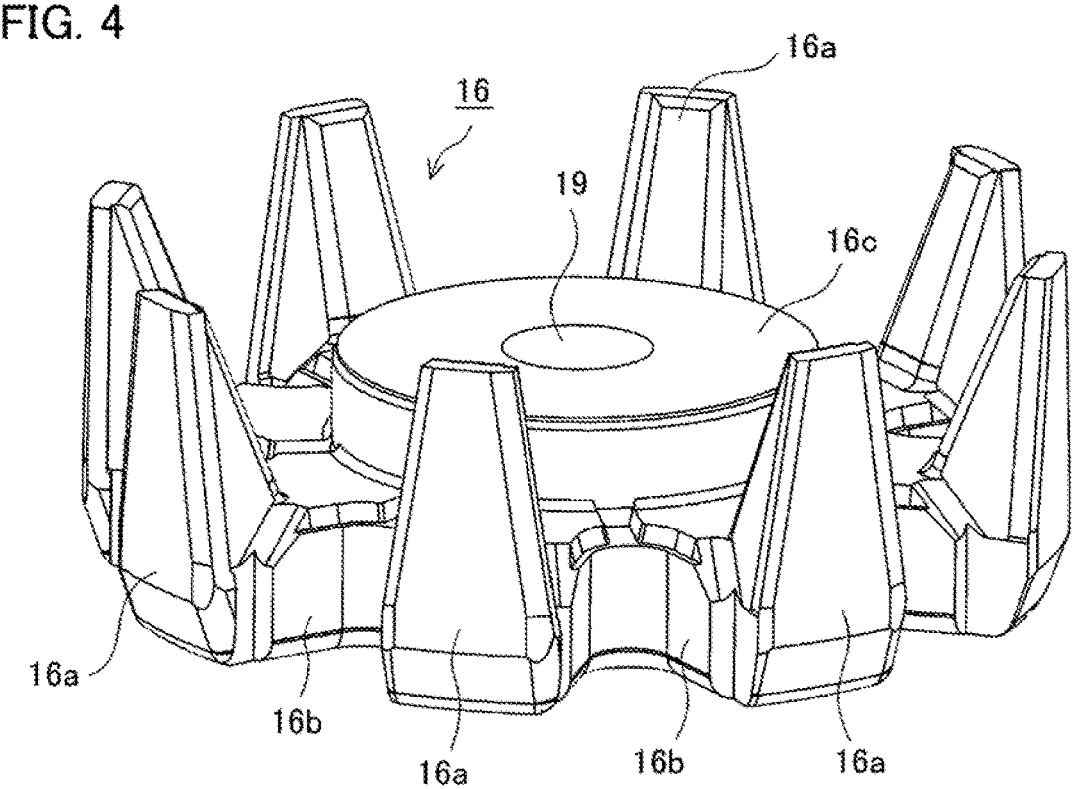
FIG. 4 is an overview view of a first pole of the electric rotating machine according to Embodiment 1.

FIG. 1 is a sectional view exemplarily showing an electric rotating machine according to Embodiment 1; FIG. 2 is an overview view showing a rotor of the electric rotating machine according to Embodiment 1; FIG. 3 is a perspective view showing an overview of a pole core body applied to the rotor of the electric rotating machine according to Embodiment 1; and FIG. 4 is a perspective view showing a first pole that constitutes the overview of the pole core body. In FIG. 1 to FIG. 4, an electric rotating machine 1 serving as a vehicular alternating current (AC) generator motor is divided into a rotating machine unit 2 and an electrical device unit 3; and the electrical device unit 3 is configured to supply power to a rotor winding 18 via a brush 8 and a slip ring 9 and is furnished with a power circuit section that supplies power to a stator winding 12.

In the rotating machine unit 2, a shaft 6 is supported to substantially bowl-shaped aluminum front and rear brackets 4 via bearings 7; and the shaft 6 is provided with a pulley 5 that is connected to an engine via a belt (not shown in the drawing). The front and rear brackets 4 include therein: a rotor 13 which is integrally provided with the shaft 6 and is rotatably disposed; a fan 14 fixed to the axial both end surfaces of the rotor 13; and a stator 10 which surrounds the outer circumference of the rotor 13 with a certain gap with respect to the rotor 13 and is fixed to the front and rear brackets 4.

The stator 10 includes: a cylindrical shaped stator core 11; and the stator winding 12 which is wound around the stator core 11 and receives magnetic flux from the rotor winding 18 (to be described later) according to the rotation of the rotor 13. The rotor 13 includes: the rotor winding 18 which generates the magnetic flux by a current supplied from the electrical device unit 3 via the brush 8 and the slip ring 9; and a pole core body 15 which is provided so as to cover the rotor winding 18 and in which a magnetic pole is formed by the magnetic flux. The pole core body 15 is constitutionally divided into a first pole 16 and a second pole 17, each made of low-carbon steel such as S10C by a cold forging manufacturing method or the like.

The first pole 16 has: a boss portion 16c which is made into a cylindrical body whose end surface is a regular circle and in which a shaft pass-through hole 19 is formed passing through a shaft center position; a thick ring shaped yoke portion 16b extendedly provided from one end edge portion of the boss portion 16c to the radial outside; and a first claw-shaped magnetic pole portion 16a extendedly provided from an outer circumferential portion of the yoke portion 16b to the axially other end side. As for the first claw-shaped magnetic pole portion 16a, its outermost diameter surface shape is a substantially trapezoidal shape, its circumferential width becomes gradually narrower toward the top end side, and its radial thickness is formed into a tapered shape becoming gradually thinner toward the top end side. Then, for example, eight first claw-shaped magnetic pole portions 16a are arranged at a circumferentially equal pitch in the outer circumferential portion of the yoke portion 16b.

The second pole 17 has: a boss portion which is made into a cylindrical body whose end surface is a regular circle and in which a shaft pass-through hole is formed passing through the shaft center position like the first pole 16; a thick ring shaped yoke portion 17b extendedly provided from one end edge portion of the boss portion to the radial outside; and a second claw-shaped magnetic pole portion 17a extendedly provided from an outer circumferential portion of the yoke portion 17b to the axially other end side. As for the second claw-shaped magnetic pole portion 17a, its outermost diameter surface shape is a substantially trapezoidal shape, its circumferential width becomes gradually narrower toward the top end side, and its radial thickness is formed into a tapered shape becoming gradually thinner toward the top end side. Then, for example, eight second claw-shaped magnetic pole portions 17a are arranged at a circumferentially equal pitch in the outer circumferential portion of the yoke portion 17b.

Figure 5:
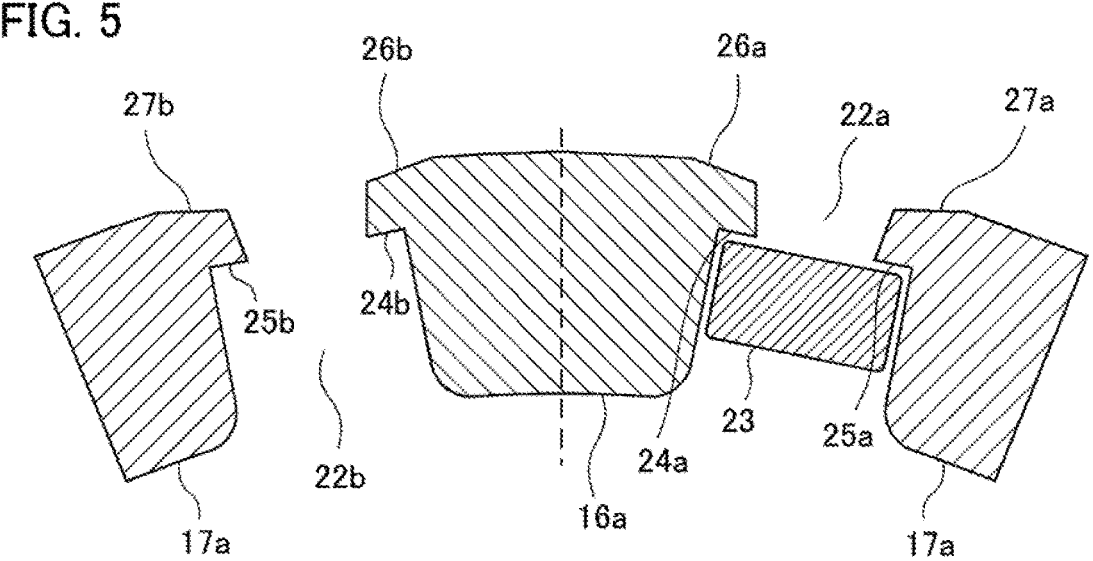
FIG. 5 is a sectional view of the pole core body of the electric rotating machine according to Embodiment 1.
Figure 6:
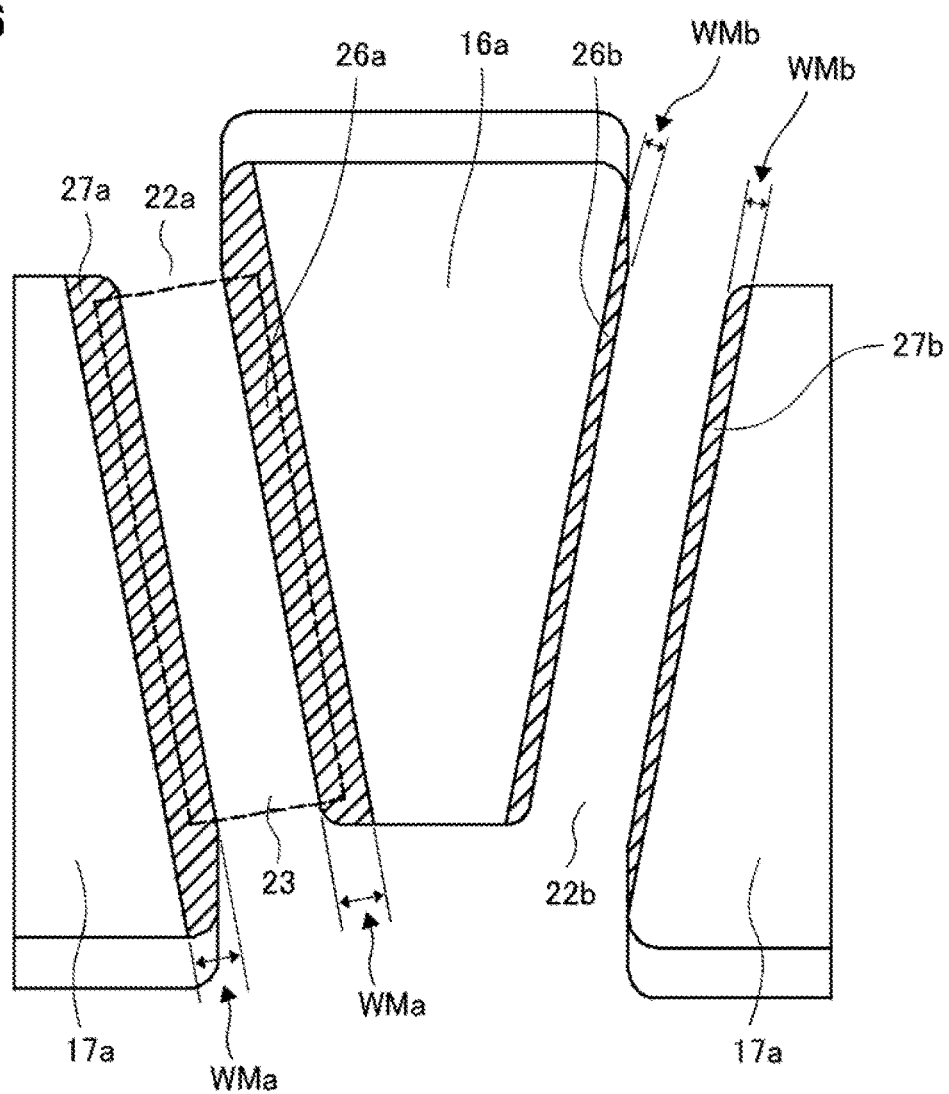
FIG. 6 is a front view of the pole core body of the electric rotating machine according to Embodiment 1.

FIG. 5 and FIG. 6 are a sectional view and a front view, respectively, each of which shows the first pole 16 and the second pole 17 according to Embodiment 1. FIG. 5 and FIG. 6 show focusing on one eighth portion in the rotation direction (circumferential direction). Since the first claw-shaped magnetic pole portion 16a and the second claw-shaped magnetic pole portion 17a are arranged in rotational symmetry, one eighth portion is shown. FIG. 5 is the axial sectional view of FIG. 6. Incidentally, in FIG. 5, a direction perpendicular to the page space is the axial direction of the first pole 16 and the second pole 17; and the upper direction of the page space is the radial direction of the first pole 16 and the second pole 17. The same is also true on the other drawings similar to FIG. 5.

Furthermore, in FIG. 6, the right direction of the page space is the rotation direction of the first pole 16 and the second pole 17; and the upper direction of the page space is the axial direction of the first pole 16 and the second pole 17. A permanent magnet 23 is furnished in some of inter-magnetic pole portions 22, the inter-magnetic pole portion 22 being formed between the first claw-shaped magnetic pole portion 16a and the second claw-shaped magnetic pole portion 17a; the first pole 16 and the second pole 17 are combined so that the first claw-shaped magnetic pole portion 16a and the second claw-shaped magnetic pole portion 17a are alternately engaged; first magnetic flux adjusting portions 24a, 24b (projection portions), which reduce the distance between the first claw-shaped magnetic pole portion 16a and the second claw-shaped magnetic pole portion 17a, are provided on both side surfaces in the rotation direction of the first claw-shaped magnetic pole portion 16a; and second magnetic flux adjusting portions 25a, 25b (projection portions), which reduce the distance between the first claw-shaped magnetic pole portion 16a and the second claw-shaped magnetic pole portion 17a, are provided on both side surfaces in the rotation direction of the second claw-shaped magnetic pole portion 17a. Furthermore, a pair of first chamfered portions 26a, 26b provided on both end sides in the rotation direction are formed on the stator side surface of the first claw-shaped magnetic pole portion 16a; and a pair of second chamfered portions 27a, 27b provided on both end sides in the rotation direction are formed on the stator side surface of the second claw-shaped magnetic pole portion 17a. The shapes of the first chamfered portion 26a and the second chamfered portion 27a, which are provided adjacent to an inter-magnetic pole portion 22a where the permanent magnet 23 is inserted, differ from those of the first chamfered portion 26b and the second chamfered portion 27b, which are provided adjacent to an inter-magnetic pole portion 22b where the permanent magnet is not inserted. For example, in FIG. 5 and FIG. 6, hatching portions in FIG. 6 denote the first chamfered portions 26a, 26b and the second chamfered portions 27a, 27b.

The operation of the electric rotating machine 1 serving as the vehicular AC generator motor will be described using FIG. 7 to FIG. 9. As shown in FIG. 9, power is supplied to the rotor winding 18 from a battery 20 of a battery section 105 and current is energized via the brush 8 and the slip ring 9. In this regard, however, in FIG. 9, a circuit that supplies power (switching element etc.) to the rotor winding 18 is not shown. By the current energized to the rotor winding 18, rotor magnetic flux and magnet magnetic flux are supplied from the rotor 13 to the stator winding 12 by a magnetic circuit like FIG. 7. Furthermore, as shown in a magnetic flux path view shown in FIG. 8, magnetic flux made by the permanent magnet 23 is divided into: a magnetic circuit that forms leakage magnetic flux 28 which passes through the second magnetic flux adjusting portion 25a via the first magnetic flux adjusting portion 24a and closes in the rotor; and output magnetic flux 29 which passes through the second claw-shaped magnetic pole portion 17a from the first claw-shaped magnetic pole portion 16a via the stator 10.

The operation of a power circuit section 103 differs between in power running and in regeneration. In the power running, power is supplied to the power circuit section 103 from the battery 20 via a power supply terminal; a control circuit section 104 performs ON/OFF control of respective switching elements 21 of the power circuit section 103, and direct current (DC) and/or AC power is supplied to the stator winding 12 of a stator winding section 101. The leakage magnetic flux 28 and the output magnetic flux 29 formed by the rotor winding 18 and the permanent magnet 23 interlink with the DC current and/or the AC current which flows through the stator winding 12 and thus driving torque is generated. The rotor 13 is rotated and driven by the driving torque. In the regeneration, the output magnetic flux formed by the rotor winding 18 of the rotor winding section 102 and the permanent magnet 23 interlinks with the stator 10, induced voltage is generated in the rotor winding 18, ON/OFF control of the respective switching elements of the power circuit section 103 is performed by the control circuit section 104, and power is supplied to the battery 20.

Figure 10:
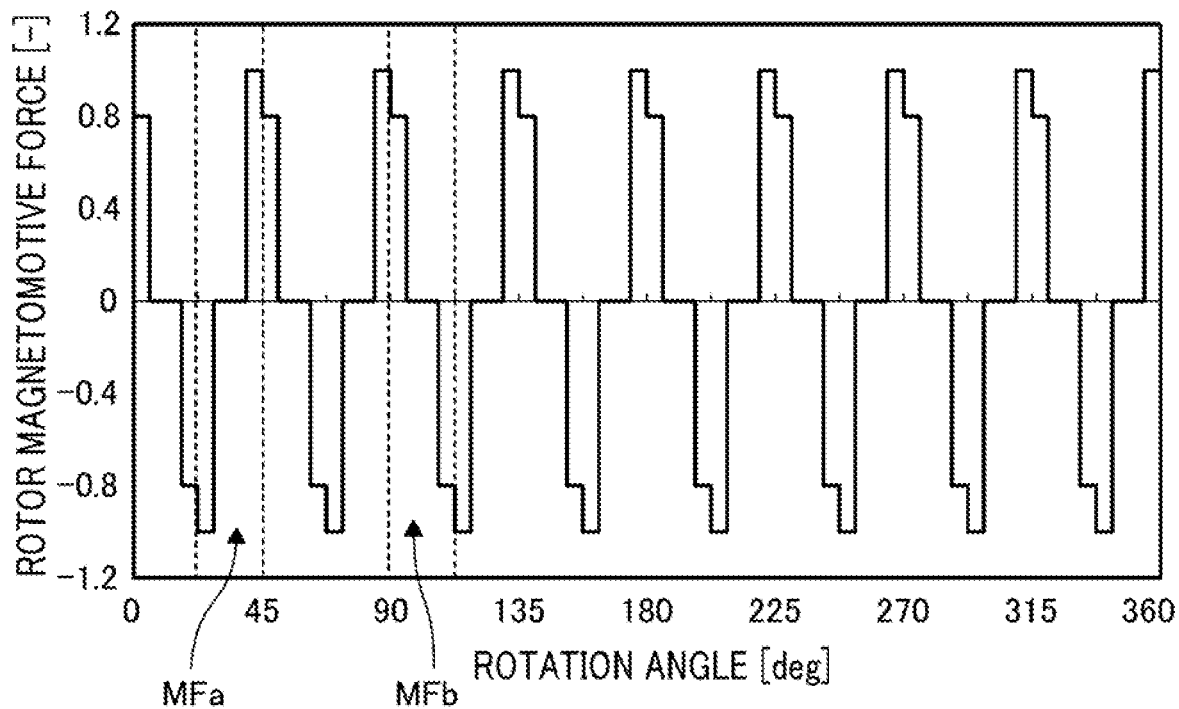
FIG. 10 is a chart showing magnetomotive force of a preceding example contrasted with the electric rotating machine according to Embodiment 1.
Figure 11:
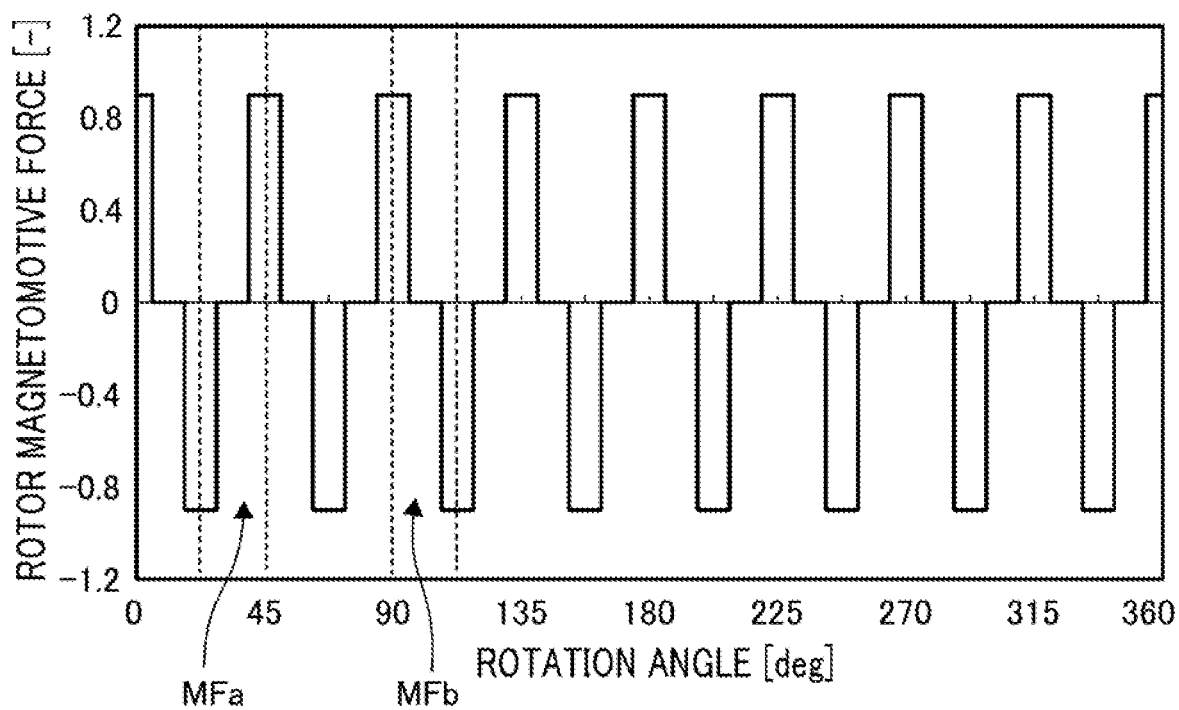
FIG. 11 is a chart showing magnetomotive force of the electric rotating machine according to Embodiment 1.
Figure 12:
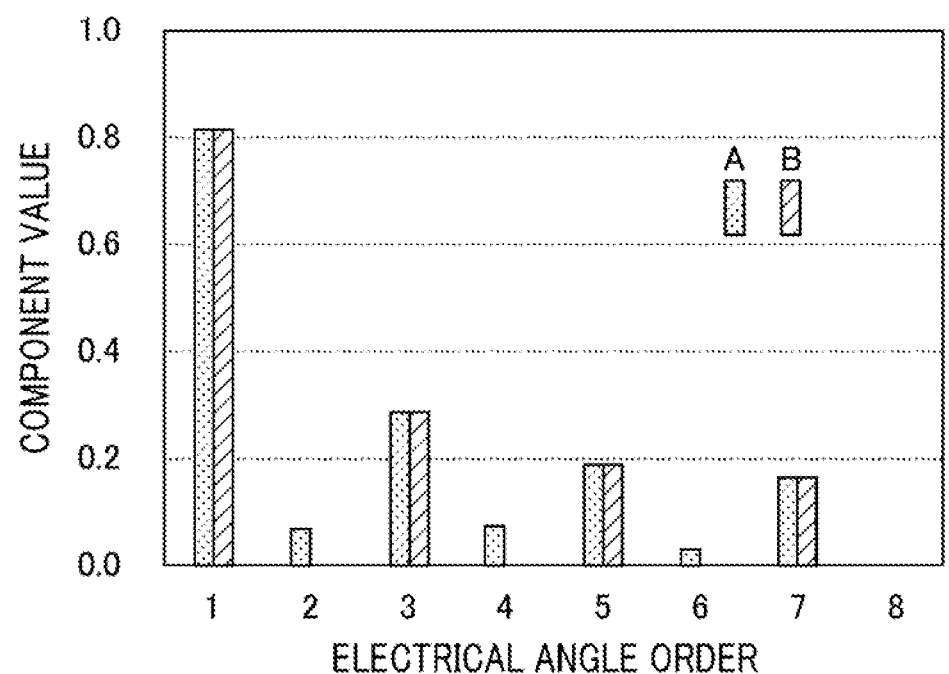
FIG. 12 is a chart for explaining a harmonic component of magnetomotive force of the electric rotating machine according to Embodiment 1.
Figure 13:
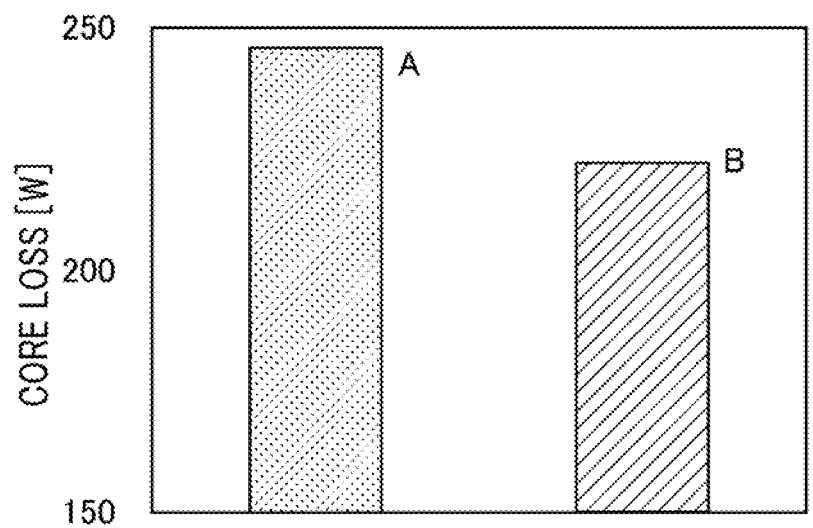
FIG. 13 is a core loss comparison chart for explaining core loss of the electric rotating machine according to Embodiment 1.

FIG. 10 is a chart showing rotor magnetomotive force of a preceding example to be contrasted with the electric rotating machine according to Embodiment 1; and FIG. 11 is a chart showing rotor magnetomotive force of the electric rotating machine according to Embodiment 1. FIG. 12 and FIG. 13 are a frequency analysis chart and a core loss reduction chart of the rotor magnetomotive force, respectively, each showing an effect of the embodiment. Incidentally, in FIG. 10 and FIG. 11, rotor magnetomotive force made in the inter-magnetic pole portion where the permanent magnet is inserted is represented by MFa; and rotor magnetomotive force made in the inter-magnetic pole portion where the permanent magnet is not inserted is represented by MFb.

In the preceding example shown in FIG. 10, since the shapes of the first chamfered portion 26a and the second chamfered portion 27a, which are adjacent to the inter-magnetic pole portion 22a where the permanent magnet 23 is inserted, are the same as those of the first chamfered portion 26b and the second chamfered portion 27b, which are adjacent to the inter-magnetic pole portion 22b where the permanent magnet is not inserted, a mechanism that adjusts the strength of the rotor magnetomotive force is not provided and the fluctuation width of the magnetomotive force in the inter-magnetic pole portion 22a where the permanent magnet 23 is inserted is larger than that in the inter-magnetic pole portion 22b where the permanent magnet is not inserted; and accordingly, the rotor magnetomotive force waveform is an asymmetric waveform.

On the other hand, in the present embodiment, for example, as shown in FIG. 6, since the rotation direction widths WMa of the first chamfered portion 26a and the second chamfered portion 27a, which are adjacent to the inter-magnetic pole portion 22a where the permanent magnet 23 is inserted, are made larger than the rotation direction widths WMb of the first chamfered portion 26b and the second chamfered portion 27b, which are adjacent to the inter-magnetic pole portion 22b where the permanent magnet is not inserted, decreasing adjustment of the rotor magnetomotive force MFa, which is made in the inter-magnetic pole portion 22a where the permanent magnet 23 is inserted, is performed and increasing adjustment of the rotor magnetomotive force MFb, which is made in the inter-magnetic pole portion 22b where the permanent magnet 23 is not inserted, can be performed; therefore, the rotor magnetomotive force waveform can be made a symmetric waveform as shown in FIG. 11. As a result, a harmonic component of the rotor magnetomotive force waveform made by the present embodiment like FIG. 12 can be made smaller than that of the preceding example and therefore motor core loss can be reduced like FIG. 13. Incidentally, in FIG. 12 and FIG. 13, characteristics in the preceding example are represented by a bar chart A (dot display); and characteristics in the present embodiment are represented by a bar chart B (hatching display).

Figure 7:
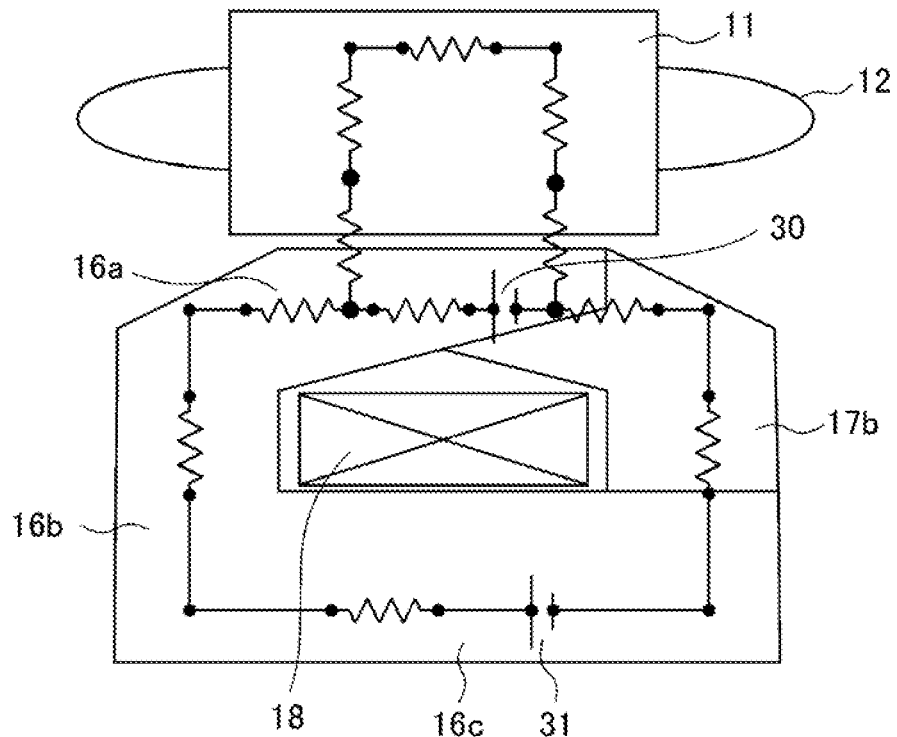
FIG. 7 is a magnetic circuit diagram for explaining a magnetic flux path of the electric rotating machine according to Embodiment 1.
Figure 8:
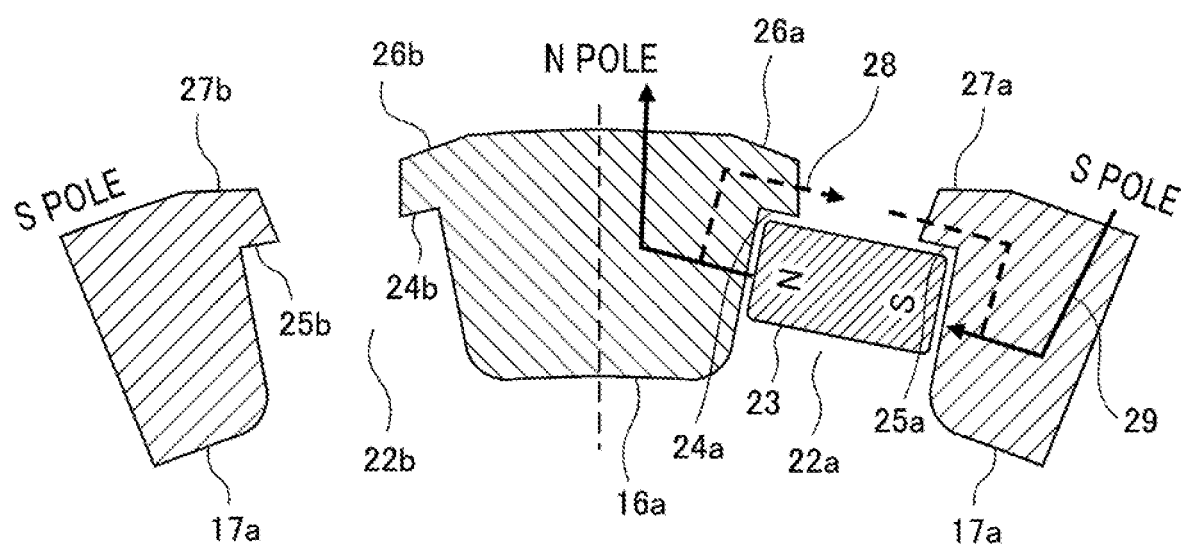
FIG. 8 is a sectional view showing the magnetic flux path of the electric rotating machine according to Embodiment 1.
Figure 9:
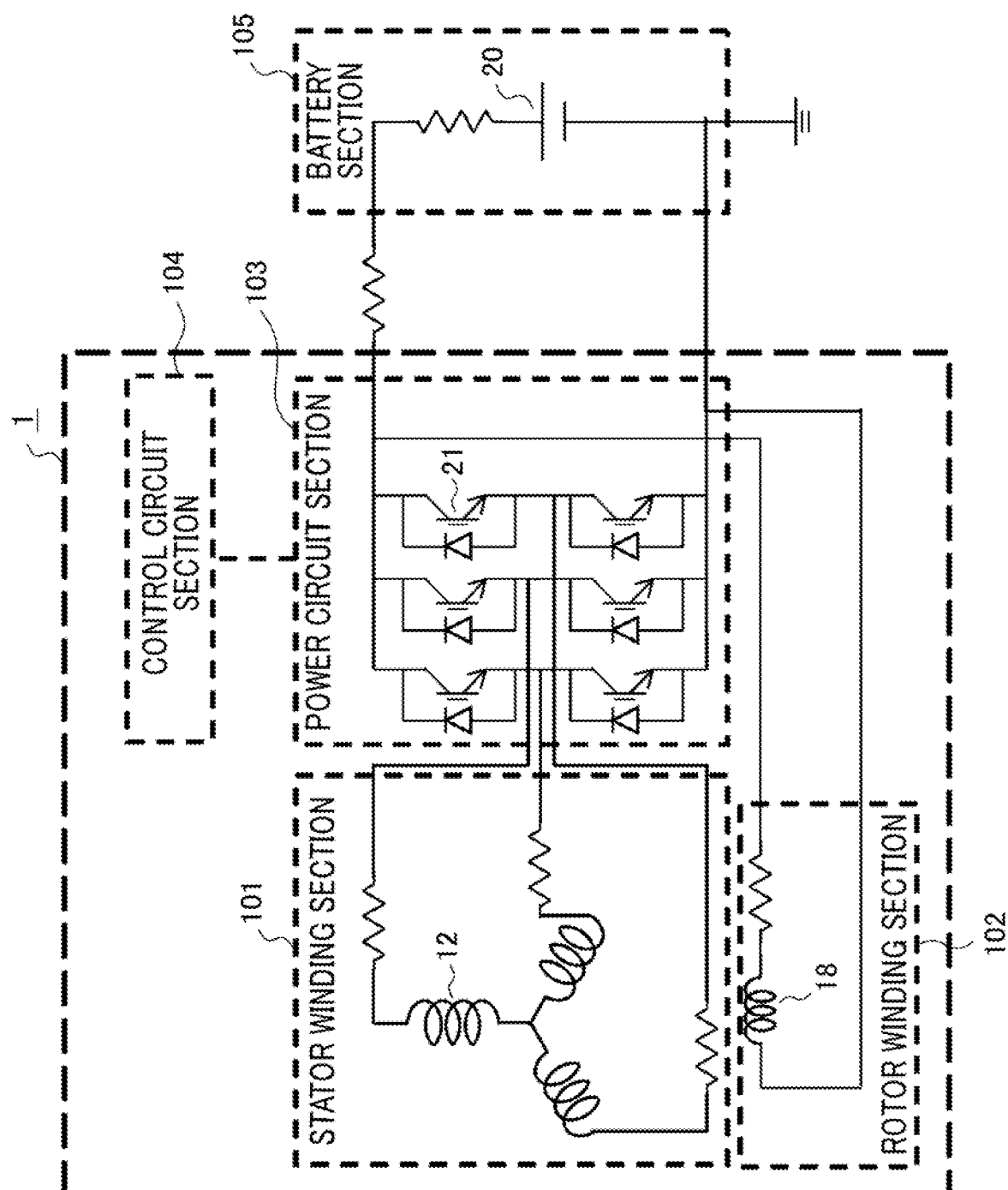
FIG. 9 is a block diagram showing an electrical circuit of the electric rotating machine according to Embodiment 1.

Incidentally, in the present embodiment, output magnetic flux paths in which the magnetic flux made by the rotor winding and the magnetic flux made by the permanent magnet 23 interlink with the stator 10 are the same (magnetic flux paths in which both output magnetic fluxes shown in FIG. 7 and FIG. 8 are strengthened each other); therefore, in the case of the rotor magnetomotive force made in the inter-magnetic pole portion 22a where the permanent magnet 23 is inserted, magnet magnetomotive force is added to the magnetic flux made by the rotor winding 18. Consequently, the rotation direction widths WMa of the first chamfered portion 26a and the second chamfered portion 27a, which are adjacent to the inter-magnetic pole portion 22a where the permanent magnet 23 is inserted, are made larger than the rotation direction widths WMb of the first chamfered portion 26b and the second chamfered portion 27b, which are adjacent to the inter-magnetic pole portion 22b where the permanent magnet 23 is not inserted, whereby the surfaces of the first and the second claw-shaped magnetic pole portions, each surface facing the stator, are adjusted and the rotor magnetomotive force waveforms is made symmetric. In FIG. 6, the rotation direction widths WMa of the first chamfered portion 26a and the second chamfered portion 27a, which are adjacent to the inter-magnetic pole portion 22a where the permanent magnet 23 is inserted, are set to 3 mm; and the rotation direction widths WMb of the first chamfered portion 26b and the second chamfered portion 27b, which are adjacent to the inter-magnetic pole portion 22b where the permanent magnet 23 is not inserted, are set to 1.6 mm.

Figure 14:
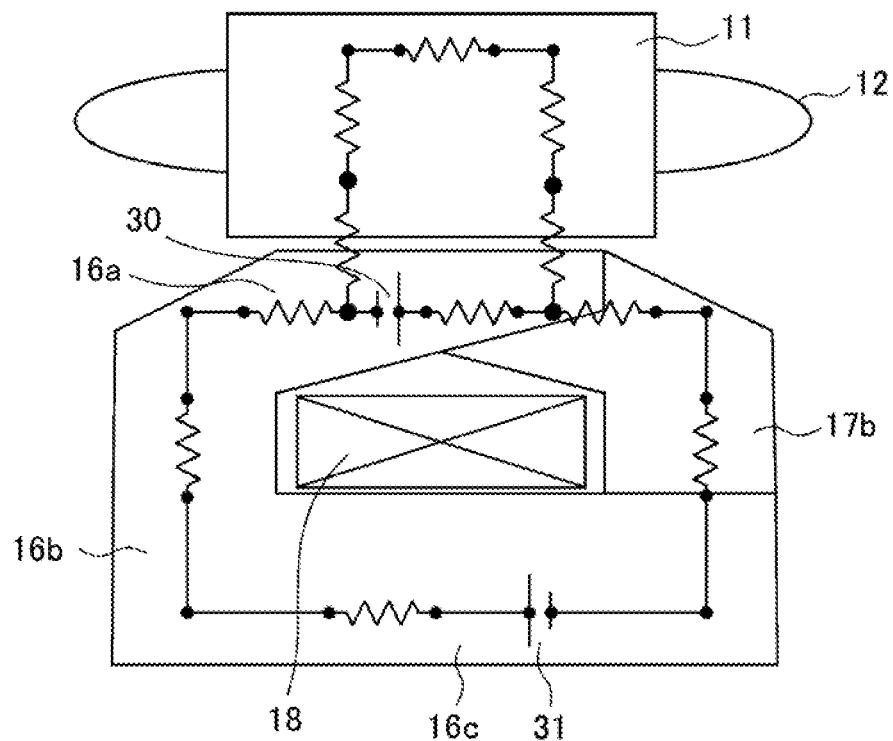
FIG. 14 is a magnetic circuit diagram of the electric rotating machine according to Embodiment 1.
Figure 15:
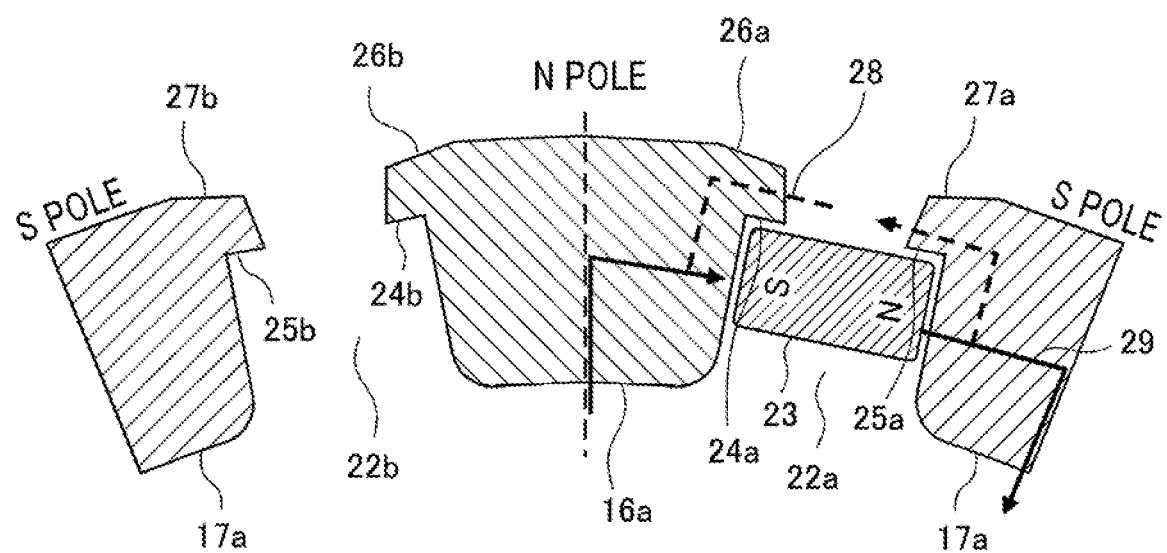
FIG. 15 is a sectional view showing a magnetic flux path of the electric rotating machine according to Embodiment 1.

As a modified example, even when the direction of the output magnetic flux path made by the rotor winding magnetomotive force is different from that made by the magnet magnetomotive force (magnetic flux paths in which both output magnetic fluxes shown in FIG. 14 and FIG. 15 are weakened each other), the reduction effect of core loss according to the present embodiment can be obtained. In that case, the magnet magnetomotive force is subtracted from the rotor winding magnetomotive force made in the inter-magnetic pole portion 22a where the permanent magnet is inserted and thus the fluctuation width of the rotor magnetomotive force made in the inter-magnetic pole portion 22b where the permanent magnet 23 is not inserted becomes larger. Consequently, if the rotation direction widths WMa of the first chamfered portion 26a and the second chamfered portion 27a, which are adjacent to the inter-magnetic pole portion 22a where the permanent magnet 23 is inserted, are made smaller than the rotation direction widths WMb of the first chamfered portion 26b and the second chamfered portion 27b, which are adjacent to the inter-magnetic pole portion 22b where the permanent magnet 23 is not inserted, a function intended for the rotor magnetomotive force waveform can be obtained.

Figure 16:
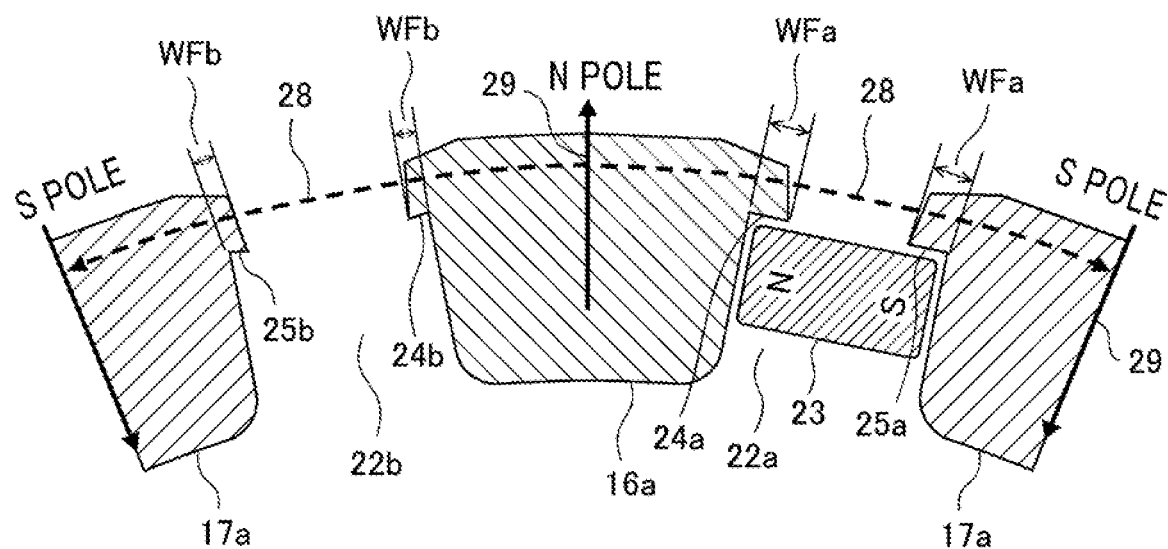
FIG. 16 is a sectional view showing a magnetic flux path of the electric rotating machine according to Embodiment 1.

Furthermore, in the present embodiment, in order to adjust the magnetomotive force made by the permanent magnet, the configuration is made such that the rotation direction widths of the first chamfered portions 26a, 26b and those of the second chamfered portions 27a, 27b are different between the inter-magnetic pole portion 22a where the permanent magnet 23 is inserted and the inter-magnetic pole portion 22b where the permanent magnet 23 is not inserted; however, as another modified example, the reduction effect of the core loss can also be obtained by adjusting the magnetomotive force made by the rotor winding 18. In that case, as shown in FIG. 16, since magnetic flux made by the rotor winding is divided into: output magnetic flux 29 shown by a solid line, which interlinks with the stator; and leakage magnetic flux 28 shown by a dashed line, which passes through the first magnetic flux adjusting portions 24a, 24b and the second magnetic flux adjusting portions 25a, 25b and closes in the rotor, the shapes of the first magnetic flux adjusting portion 24a and the second magnetic flux adjusting portion 25a, which are adjacent to the inter-magnetic pole portion 22a where the permanent magnet 23 is inserted, may differ from those of the first magnetic flux adjusting portion 24a and the second magnetic flux adjusting portion 25b, which are adjacent to the inter-magnetic pole portion 22b where the permanent magnet 23 is not inserted. Specifically, if the rotor magnetomotive force, which is made in the inter-magnetic pole portion 22a where the permanent magnet 23 is inserted, is made small by increasing the rotation direction widths WFa of the first magnetic flux adjusting portion 24a and the second magnetic flux adjusting portion 25a, which are adjacent to the inter-magnetic pole portion 22a where the permanent magnet 23 is inserted; and if the rotor magnetomotive force made in the inter-magnetic pole portion 22b where the permanent magnet 23 is not inserted is made large by reducing the rotation direction widths WFb of the first magnetic flux adjusting portion 24b and the second magnetic flux adjusting portion 25b, which are adjacent to the inter-magnetic pole portion 22b where the permanent magnet 23 is not inserted, the rotor magnetomotive force waveform can be made a symmetric waveform. That is, the rotation direction widths WFa of the first magnetic flux adjusting portion 24a and the second magnetic flux adjusting portion 25a are made larger than the rotation direction widths WFb of the first magnetic flux adjusting portion 24b and the second magnetic flux adjusting portion 25b. In FIG. 16, the rotation direction widths WFa of the first magnetic flux adjusting portion 24a and the second magnetic flux adjusting portion 25a, which are adjacent to the inter-magnetic pole portion 22a where the permanent magnet 23 is inserted, are set to 2.5 mm; and the rotation direction widths WFb of the first magnetic flux adjusting portion 24b and the second magnetic flux adjusting portion 25b, which are adjacent to the inter-magnetic pole portion 22b where the permanent magnet 23 is not inserted, are set to 1.1 mm.

Embodiment 2

Figure 17:
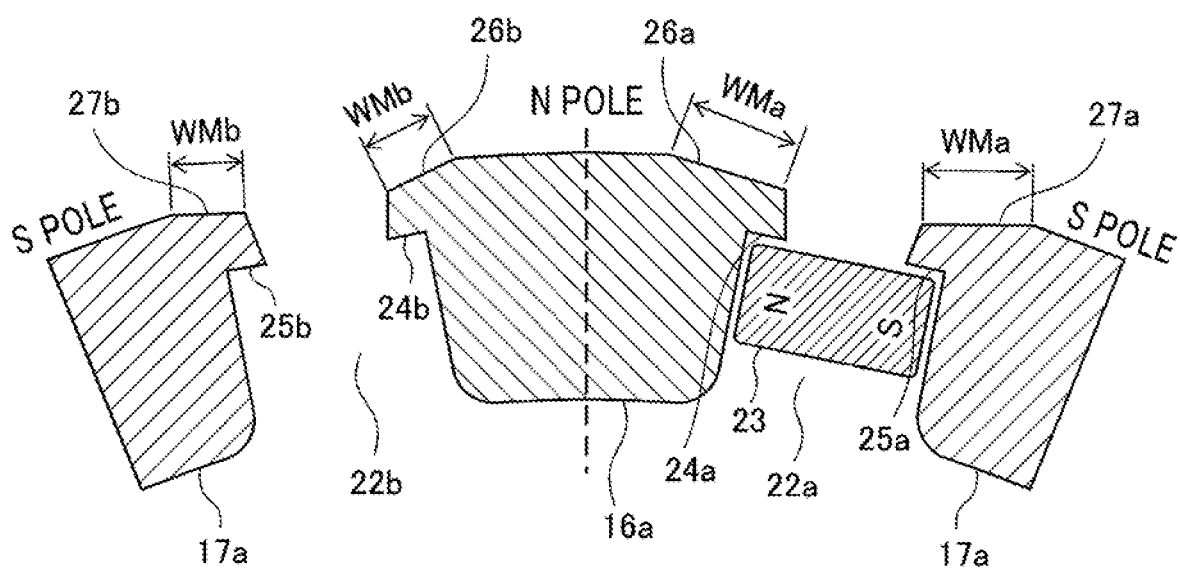
FIG. 17 is a sectional view of a pole core body of an electric rotating machine according to Embodiment 2.

FIG. 17 is a sectional view showing the vicinity of a first claw-shaped magnetic pole portion 16a of a first pole 16, a second claw-shaped magnetic pole portion 17a of a second pole 17, and a permanent magnet 23 of a rotor according to Embodiment 2. The rotation direction widths WMa of a first chamfered portion 26a and a second chamfered portion 27a, which are adjacent to an inter-magnetic pole portion 22a where the permanent magnet 23 is inserted, is wider than the rotation direction widths WMb of a first chamfered portion 26b and a second chamfered portion 27b, which are adjacent to an inter-magnetic pole portion 22b where the permanent magnet 23 is not inserted.

According to Embodiment 2, the rotation direction widths of the first chamfered portion 26a and the second chamfered portion 27a, which are adjacent to the inter-magnetic pole portion 22a where the permanent magnet 23 is inserted, are configured to be wider than those of the first chamfered portion 26b and the second chamfered portion 27b, which are adjacent to the inter-magnetic pole portion 22b where the permanent magnet is not inserted; thus, a reduction function of motor core loss can be obtained by magnetic flux paths in which output magnetic fluxes of magnet magnetomotive force and rotor winding magnetomotive force in FIG. 7 and FIG. 8 are strengthened each other like Embodiment 1. Consequently, both an improvement effect of rotor magnetomotive force and a reduction effect of motor core loss can be compatible by inserting the permanent magnet in addition to a rotor winding.

Embodiment 3

Figure 18:
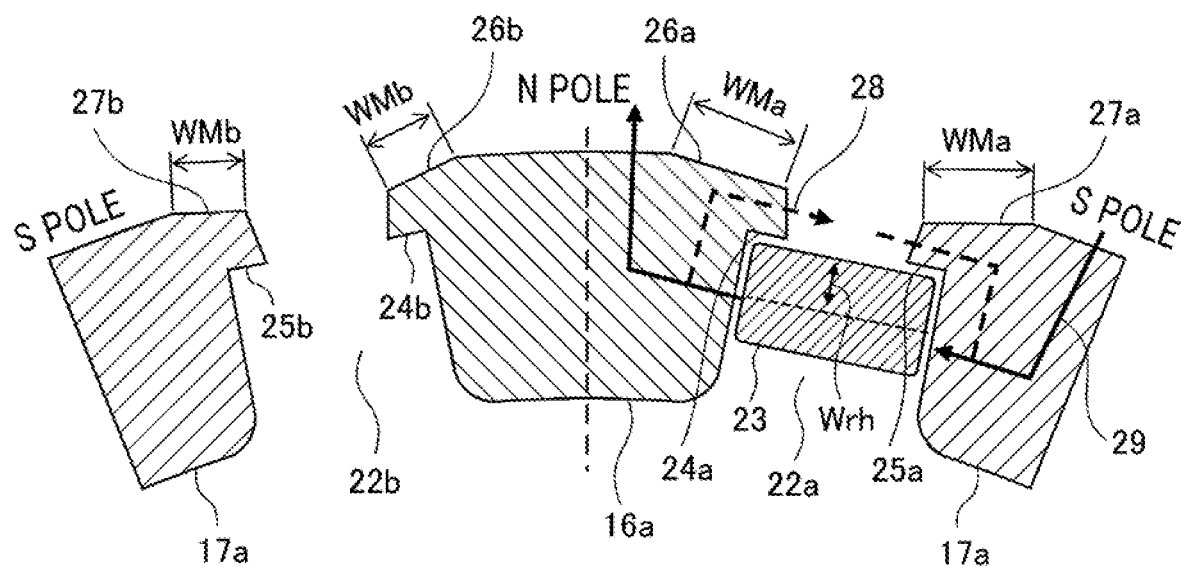
FIG. 18 is a sectional view showing a magnetic flux path of an electric rotating machine according to Embodiment 3.

FIG. 18 is a sectional view showing the vicinity of a first claw-shaped magnetic pole portion 16a of a first pole 16, a second claw-shaped magnetic pole portion 17a of a second pole 17, and a permanent magnet 23 of a rotor according to Embodiment 3. The rotation direction widths WMa of a first chamfered portion 26a and a second chamfered portion 27a, which are adjacent to an inter-magnetic pole portion 22a where the permanent magnet 23 is inserted, are wider than half the radial width Wrh of the magnetic flux output surface of the permanent magnet 23.

Magnetic flux made by the permanent magnet 23 is divided into: a magnetic circuit that forms leakage magnetic flux 28 which passes through a second magnetic flux adjusting portion 25a via a first magnetic flux adjusting portion 24a and closes in the rotor; and output magnetic flux 29 which passes through the second claw-shaped magnetic pole portion 17a from the first claw-shaped magnetic pole portion 16a via a stator 10. In the case of a relationship where magnet magnetomotive force and rotor winding magnetomotive force are strengthened each other as shown in FIG. 7 and FIG. 8, decreasing adjustment of magnet magnetic flux made in the inter-magnetic pole portion is performed by widening the rotation direction widths of the first chamfered portion 26a and the second chamfered portion 27a, which are adjacent to the inter-magnetic pole portion, in the inter-magnetic pole portion 22a where the permanent magnet 23 is inserted. In this case, since magnetomotive force equivalent to half the magnet magnetomotive force having two magnetic circuits becomes output magnetic flux, a configuration effective for actualizing the decreasing adjustment of the magnetic flux is made such that there may be selected the rotation direction widths of the first chamfered portion 26a and the second chamfered portion 27a on the basis of the size of half the radial width Wrh of the magnet, which corresponds to the output surface of the magnet magnetomotive force that contributes to the output magnetic flux. Consequently, by the configuration of Embodiment 3, the rotor magnetomotive force waveform is made a symmetric waveform and a reduction function of motor core loss can be effectively obtained.

Embodiment 4

Figure 19:
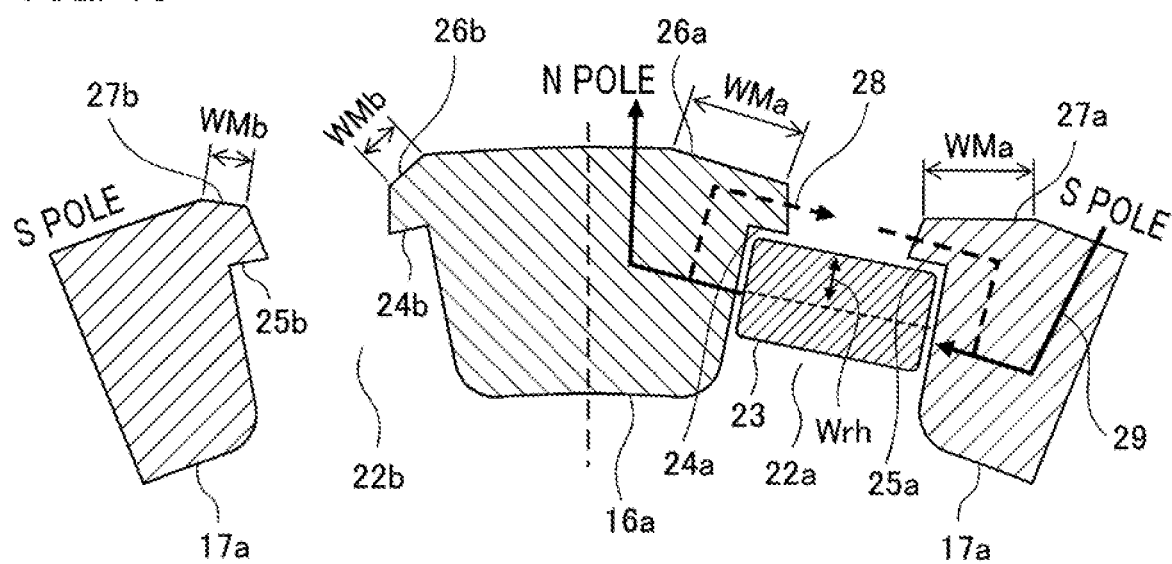
FIG. 19 is a sectional view showing a magnetic flux path of an electric rotating machine according to Embodiment 4.

FIG. 19 is a sectional view showing the vicinity of a first claw-shaped magnetic pole portion 16a of a first pole 16, a second claw-shaped magnetic pole portion 17a of a second pole 17, and a permanent magnet 23 of a rotor according to Embodiment 4. The rotation direction widths WMb of the first chamfered portion 26b and the second chamfered portion 27b, which are adjacent to an inter-magnetic pole portion 22b where the permanent magnet 23 is not inserted, are narrower than half the radial width Wrh of the magnetic flux output surface of the permanent magnet 23.

Magnetic flux made by the permanent magnet 23 is divided into: a magnetic circuit that forms leakage magnetic flux 28 which passes through a second magnetic flux adjusting portion 25a via a first magnetic flux adjusting portion 24a and closes in the rotor; and output magnetic flux 29 which passes through the second claw-shaped magnetic pole portion 17a from the first claw-shaped magnetic pole portion 16a via a stator 10. In the case of a relationship where magnet magnetomotive force and rotor winding magnetomotive force are strengthened each other as shown in FIG. 7 and FIG. 8, decreasing adjustment of rotor winding magnetic flux is performed by the rotation direction widths WMa of a first chamfered portion 26a and a second chamfered portion 27a, which are adjacent to an inter-magnetic pole portion 22a where the permanent magnet 23 is inserted; and increasing adjustment of the rotor winding magnetic flux is performed by the rotation direction widths WMb of the first chamfered portion 26b and the second chamfered portion 27b, which are adjacent to the inter-magnetic pole portion 22b where the permanent magnet is not inserted. In this case, it is effective to achieve a configuration that adjusts output magnetic flux equivalent to half the magnet magnetomotive force by the rotation direction widths of the first chamfered portion 26a and the second chamfered portion 27a, which are adjacent to the inter-magnetic pole portion 22a where the permanent magnet is inserted; thus, a function in which a rotor magnetomotive force waveform is made symmetric can be effectively obtained by the configuration of Embodiment 4.

Embodiment 5

Figure 20:
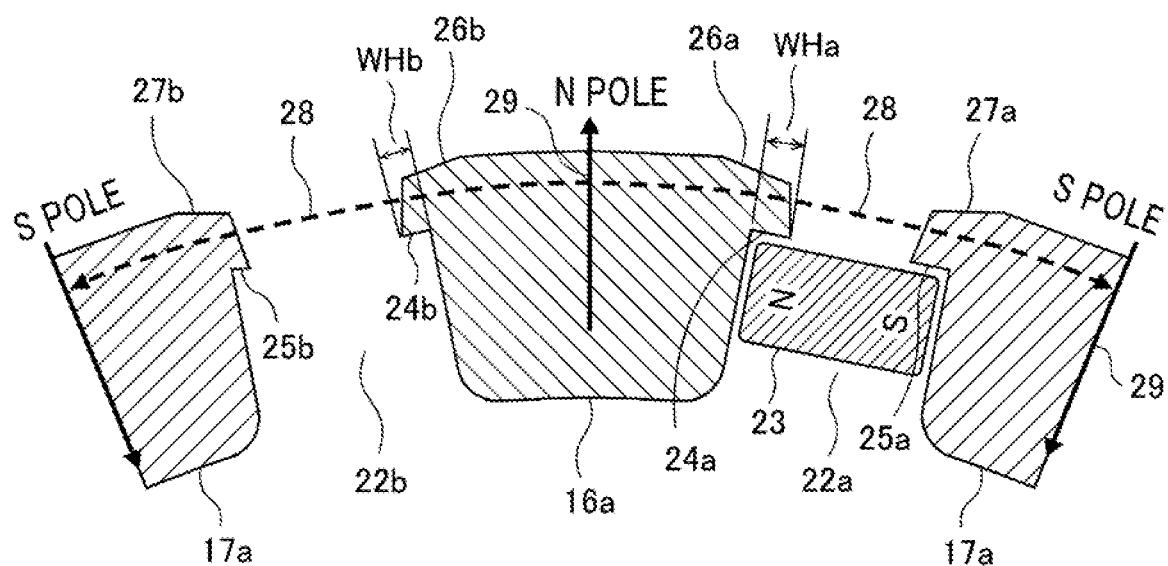
FIG. 20 is a sectional view showing a magnetic flux path of an electric rotating machine according to Embodiment 5.

FIG. 20 is a sectional view showing the vicinity of a first claw-shaped magnetic pole portion 16a of a first pole 16, a second claw-shaped magnetic pole portion 17a of a second pole 17, and a permanent magnet 23 of a rotor according to Embodiment 5. The rotation direction widths WHa of a first magnetic flux adjusting portion 24a and a second magnetic flux adjusting portion 25a, which are adjacent to an inter-magnetic pole portion 22a where the permanent magnet 23 is inserted, are wider than the rotation direction widths WHb of a first magnetic flux adjusting portion 24b and a second magnetic flux adjusting portion 25b, which are adjacent to an inter-magnetic pole portion 22b where the permanent magnet is not inserted.

Magnetic flux made by the permanent magnet 23 is divided into: a magnetic circuit that forms the leakage magnetic flux 28 which passes through the second magnetic flux adjusting portion 25a via the first magnetic flux adjusting portion 24a and closes in the rotor; and output magnetic flux 29 which passes through the second claw-shaped magnetic pole portion 17a from the first claw-shaped magnetic pole portion 16a via a stator 10. In the case of a relationship where magnet magnetomotive force and rotor winding magnetomotive force are strengthened each other as shown in FIG. 7 and FIG. 8, the rotation direction widths of the first magnetic flux adjusting portion 24a and the second magnetic flux adjusting portion 25a, which are adjacent to the inter-magnetic pole portion 22a where the permanent magnet is inserted, are widened to increase the magnet leakage magnetic flux; thus, decreasing adjustment of the output magnetic flux can be performed and therefore a reduction effect of core loss can be effectively obtained by the configuration of Embodiment 5.

Embodiment 6

Figure 21:
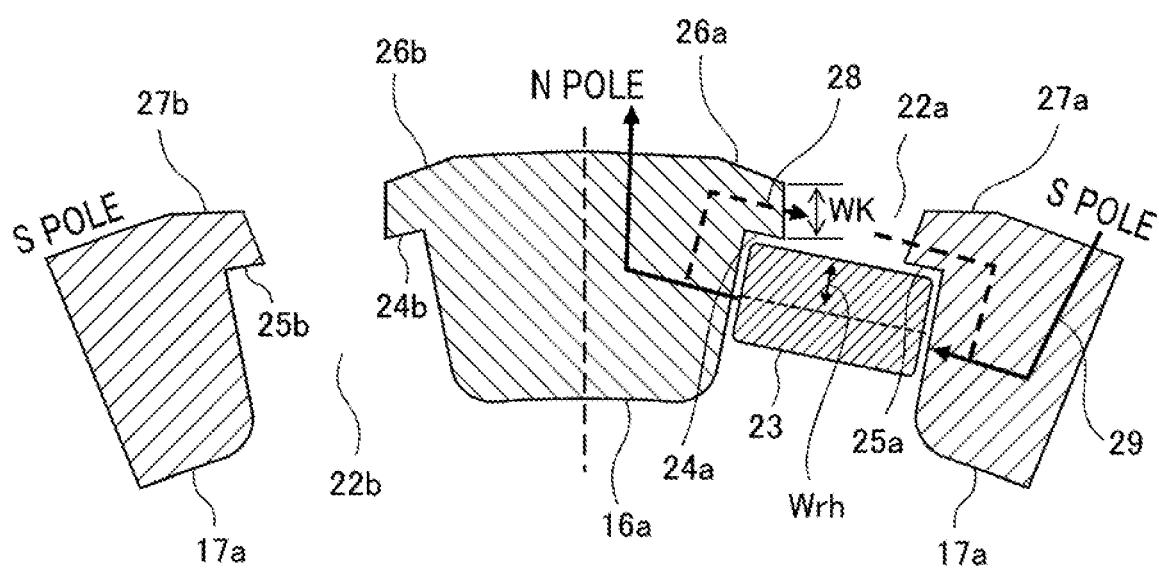
FIG. 21 is a sectional view showing a magnetic flux path of an electric rotating machine according to Embodiment 6.

FIG. 21 is a sectional view showing the vicinity of a first claw-shaped magnetic pole portion 16a of a first pole 16, a second claw-shaped magnetic pole portion 17a of a second pole 17, and a permanent magnet 23 of a rotor according to Embodiment 6. The radial width WK of a first magnetic flux adjusting portion 24a and a second magnetic flux adjusting portion 25a, which are adjacent to an inter-magnetic pole portion 22a where the permanent magnet 23 is inserted, is wider than half the radial width Wrh of the magnetic flux output surface of the permanent magnet.

Magnetic flux made by the permanent magnet 23 is divided into: a magnetic circuit that forms leakage magnetic flux 28 which passes through the second magnetic flux adjusting portion 25a via the first magnetic flux adjusting portion 24a and closes in the rotor; and output magnetic flux 29 which passes through the second claw-shaped magnetic pole portion 17a from the first claw-shaped magnetic pole portion 16a via a stator 10. In the case of a relationship where magnet magnetomotive force and rotor winding magnetomotive force are strengthened each other as shown in FIG. 7 and FIG. 8, the radial direction widths of the first magnetic flux adjusting portion 24a and the second magnetic flux adjusting portion 25a, which are adjacent to the inter-magnetic pole portion 22a where the permanent magnet is inserted, are widened to increase the magnet leakage magnetic flux; thus, decreasing adjustment of the output magnetic flux can be performed. In this case, a reduction effect of core loss can be effectively obtained by the configuration of the present embodiment in which the radial widths WK of the first magnetic flux adjusting portion 24a and the second magnetic flux adjusting portion 25a are made wider than half the radial width Wrh that is the output surface of the magnet magnetic flux to reduce the leakage magnetic flux equivalent to half the magnet magnetomotive force.

Embodiment 7

Figure 22:
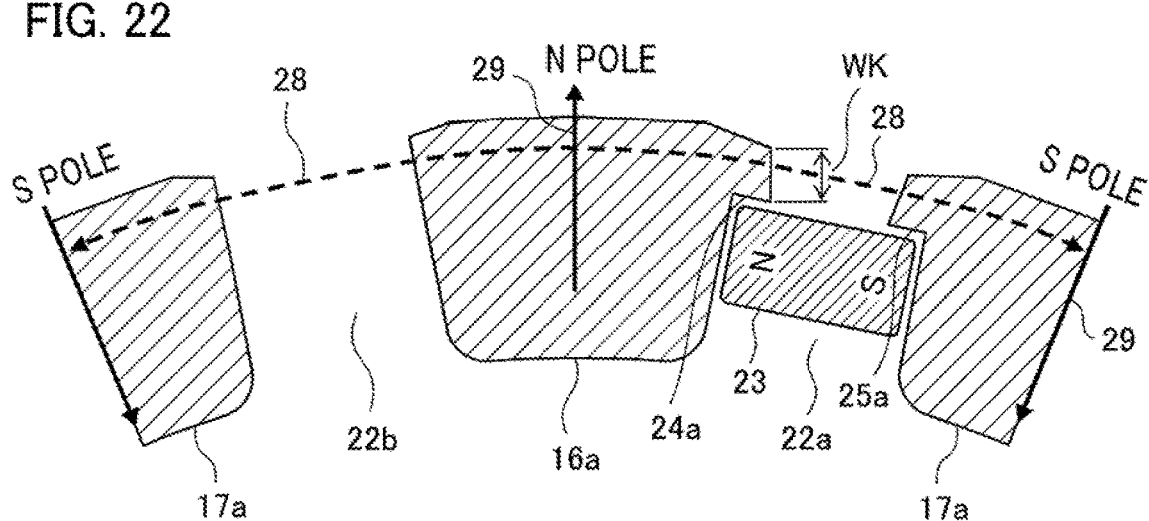
FIG. 22 is a sectional view showing a magnetic flux path of an electric rotating machine according to Embodiment 7.

FIG. 22 is a sectional view showing the vicinity of a first claw-shaped magnetic pole portion 16a of a first pole 16, a second claw-shaped magnetic pole portion 17a of a second pole 17, and a permanent magnet 23 of a rotor according to Embodiment 7. A first magnetic flux adjusting portion 24b and a second magnetic flux adjusting portion 25b are not provided in an inter-magnetic pole portion 22b where the permanent magnet 23 is not inserted and the first magnetic flux adjusting portion 24b is not adjacent to the second magnetic flux adjusting portion 25b. That is, the first magnetic flux adjusting portion 24a and the second magnetic flux adjusting portion 25a are provided only in an inter-magnetic pole portion 22a where the permanent magnet 23 is inserted.

Magnetic flux made by the permanent magnet 23 is divided into: a magnetic circuit that forms leakage magnetic flux 28 which passes through the second magnetic flux adjusting portion 25a via the first magnetic flux adjusting portion 24a and closes in the rotor; and output magnetic flux 29 which passes through the second claw-shaped magnetic pole portion 17a from the first claw-shaped magnetic pole portion 16a via a stator 10. In the case of a relationship where magnet magnetomotive force and rotor winding magnetomotive force are strengthened each other as shown in FIG. 7 and FIG. 8, decreasing adjustment of the output magnetic flux is performed by the first magnetic flux adjusting portion 24a and the second magnetic flux adjusting portion 25a, which are adjacent to the inter-magnetic pole portion 22a where the permanent magnet 23 is inserted; and increasing adjustment of the output magnetic flux is performed by the first magnetic flux adjusting portion 24b and the second magnetic flux adjusting portion 25b, which are adjacent to the inter-magnetic pole portion 22b where the permanent magnet is not inserted. In this case, a configuration is made such that the second magnetic flux adjusting portion 25b and the first magnetic flux adjusting portion 24b are not adjacent to the inter-magnetic pole portion 22b where the permanent magnet is not inserted; thus, increasing adjustment of the inter-magnetic pole portion 22b where the permanent magnet is not inserted produces the maximum output magnetic flux and therefore rotor magnetomotive force can be utilized as the maximum output magnetic flux while obtaining a reduction function of motor core loss.

Embodiment 8

Figure 23:
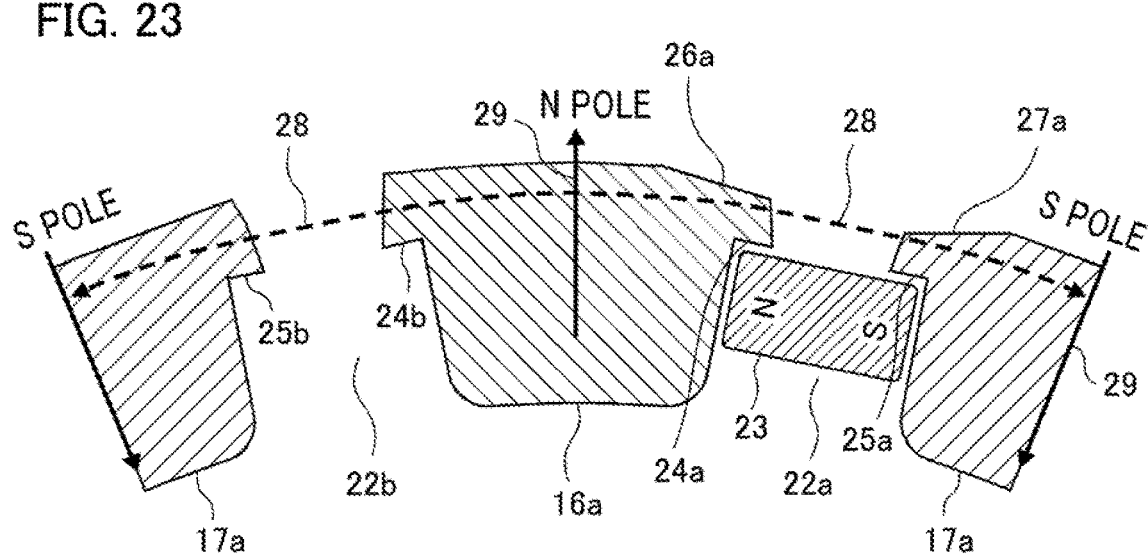
FIG. 23 is a sectional view showing a magnetic flux path of an electric rotating machine according to Embodiment 8.

FIG. 23 is a sectional view showing the vicinity of a first claw-shaped magnetic pole portion 16a of a first pole 16, a second claw-shaped magnetic pole portion 17a of a second pole 17, and a permanent magnet 23 of a rotor according to Embodiment 8. A first chamfered portion 26b and a second chamfered portion 27b are not provided in an inter-magnetic pole portion 22b where the permanent magnet is not inserted; and the first chamfered portion 26b and the second chamfered portion 27b are not adjacent to the inter-magnetic pole portion 22b. That is, the first chamfered portion 26a and the second chamfered portion 27b are provided only in an inter-magnetic pole portion 22a where the permanent magnet 23 is inserted.

Magnetic flux made by the permanent magnet 23 is divided into: a magnetic circuit that forms leakage magnetic flux 28 which passes through the second magnetic flux adjusting portion 25a via the first magnetic flux adjusting portion 24a and closes in the rotor; and output magnetic flux 29 which passes through the second claw-shaped magnetic pole portion 17a from the first claw-shaped magnetic pole portion 16a via a stator 10. In the case of a relationship where magnet magnetomotive force and rotor winding magnetomotive force are strengthened each other as shown in FIG. 7 and FIG. 8, decreasing adjustment of the output magnetic flux is performed by the first chamfered portion 26a and the second chamfered portion 27a, which are adjacent to the inter-magnetic pole portion 22a where the permanent magnet is inserted; and increasing adjustment of the output magnetic flux is performed by the first chamfered portion 26b and the second chamfered portion 27b, which are adjacent to the inter-magnetic pole portion 22b where the permanent magnet is not inserted. In this case, a configuration is made such that the first chamfered portion 26b and the second chamfered portion 27b are not adjacent to the inter-magnetic pole portion 22b where the permanent magnet is not inserted; thus, increasing adjustment of the inter-magnetic pole portion 22b where the permanent magnet is not inserted produces the maximum output magnetic flux and therefore rotor magnetomotive force can be utilized as the maximum output magnetic flux while obtaining a reduction function of motor core loss.

Embodiment 9

Figure 24:
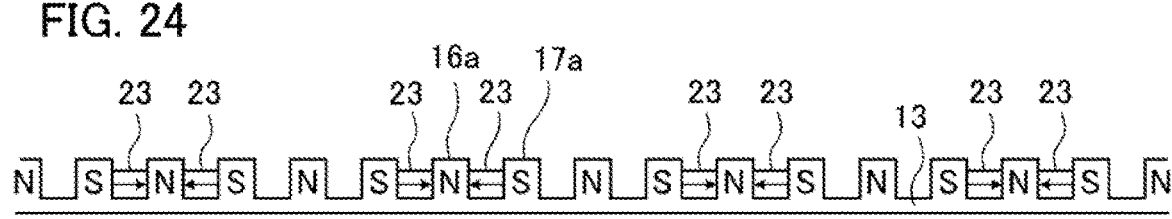
FIG. 24 is a typical view showing an example of the arrangement of a magnetic pole of a rotor and a permanent magnet of an electric rotating machine according to Embodiment 9.

FIG. 24 is a typical view showing the arrangement of a magnetic pole and a permanent magnet 23 of a rotor 13 of an electric rotating machine according to Embodiment 9. In the same drawing, a direction perpendicular to the page space is the axial direction of the rotor 13; the upper direction of the page space is the radial direction of the rotor 13; and the left direction of the page space is the rotation direction of the rotor 13. The number of inter-magnetic pole portions 22*a* where the permanent magnet 23 is inserted is the same as that of inter-magnetic pole portions 22*b* where the permanent magnet 23 is not inserted. The rotation direction is taken as a linear direction by being simplified in FIG. 24; and a first claw-shaped magnetic pole portion 16*a* and a second claw-shaped magnetic pole portion 17*a*, which constitute the magnetic pole, and the permanent magnet 23 are linearly shown.

The number of the inter-magnetic pole portions 22*a* where the permanent magnet 23 is inserted is the same as that of the inter-magnetic pole portions 22*b* where the permanent magnet 23 is not inserted; thus, the number of the inter-magnetic pole portions where magnet magnetomotive force is added to rotor winding magnetomotive force by inserting the permanent magnet 23 can be the same as that of the inter-magnetic pole portions where the rotor winding magnetomotive force is maintained by not inserting the permanent magnet 23 and therefore a function in which a rotor magnetomotive force waveform is made a symmetric shape can be effectively obtained.

Embodiment 10

Figure 25:
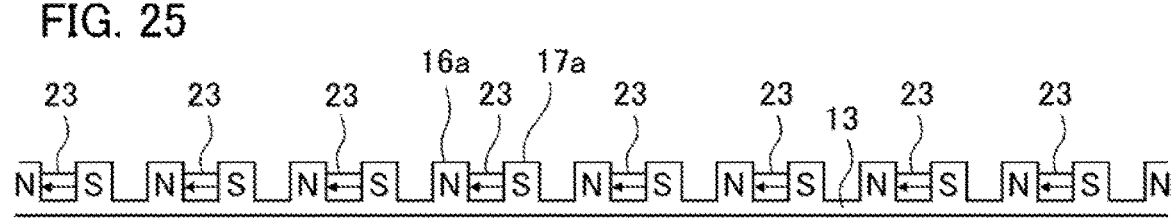
FIG. 25 is a typical view showing the arrangement of a magnetic pole and a permanent magnet of a rotor of an electric rotating machine according to Embodiment 10.

FIG. 25 is a typical view showing the arrangement of a magnetic pole and a permanent magnet 23 of a rotor 13 of an electric rotating machine according to Embodiment 10. In the same drawing, a direction perpendicular to the page space is the axial direction of the rotor 13; the upper direction of the page space is the radial direction of the rotor 13; and the left direction of the page space is the rotation direction of the rotor 13. An inter-magnetic pole portion 22*a* where the permanent magnet 23 is inserted and an inter-magnetic pole portion 22*b* where the permanent magnet 23 is not inserted, are alternately arranged in the rotation direction. The rotation direction is taken as a linear direction by being simplified in FIG. 25; and a first claw-shaped magnetic pole portion 16*a* and a second claw-shaped magnetic pole portion 17*a*, which constitute the magnetic pole, and the permanent magnet 23 are linearly shown.

The inter-magnetic pole portion 22*a* where the permanent magnet 23 is inserted and the inter-magnetic pole portion 22*b* where the permanent magnet is not inserted, are alternately arranged in the rotation direction; thus, periodicity of the magnitude of a rotor magnetomotive force waveform can be regarded as one period in the two inter-magnetic pole portions and asymmetry property becomes a minimum unit. Consequently, a change in the structure of a chamfered portion or a magnetic flux adjusting portion, which is for obtaining a reduction effect of motor core loss can be performed in the period of the minimum unit. If the period of the structure change can be reduced, when metal mold processing is applied for each period, the structure of metal mold can take a simpler form; thus, production facilities for obtaining the reduction effect of motor core loss can be simplified.

On the basis of the foregoing respective embodiments, the embodiments of the electric rotating machine according to the present application have the configuration in which the shapes of the first chamfered portion and the second chamfered portion, which are adjacent to the inter-magnetic pole portion where the permanent magnet is inserted, differ from those of the first chamfered portion and the second chamfered portion, which are adjacent to the inter-magnetic pole portion where the permanent magnet is not inserted, and/or the configuration in which the shapes of the first magnetic flux adjusting portion and the second magnetic flux adjusting portion, which are adjacent to the inter-magnetic pole portion where the permanent magnet is inserted, differ from those of the first magnetic flux adjusting portion and the second magnetic flux adjusting portion, which are adjacent to the inter-magnetic pole portion where the permanent magnet is not inserted; and both configurations influence on the rotor magnetomotive force waveform.

The present application describes various exemplified embodiments and examples; however, various features, aspects, and functions described in one or a plurality of embodiments are not limited to specific embodiments, but are applicable to embodiments individually or in various combinations thereof. Therefore, countless modified examples not exemplified are assumed in technical ranges disclosed in the specification of the present application. For example, there include: a case in which at least one constituent element is modified; a case, added; or a case, deleted; and a case in which at least one constituent element is extracted to combine with constituent elements of other embodiments.

What is claimed is:

1. An electric rotating machine comprising:
    a rotor; and
    a stator configured to be arranged via an air gap with respect to the outer circumference of the rotor;
    the rotor being configured to have a rotor winding, and a pole core body constituted by combining a first pole with a second pole and wherein the rotor winding is arranged in an internal space formed by the first pole and the second pole;
    the first pole being configured to have a plurality of first claw-shaped magnetic pole pieces arranged with a space in a rotation direction of the rotor;
    the second pole being configured to have a plurality of second claw-shaped magnetic pole pieces arranged with a space in the rotation direction of the rotor;
    the first claw-shaped magnetic pole pieces and the second claw-shaped magnetic pole pieces being configured to be furnished with permanent magnets in some of inter-magnetic poles, the inter-magnetic poles being formed between the first and second claw-shaped magnetic pole pieces; and
    the first pole and the second pole being configured to be combined so that the first claw-shaped magnetic pole pieces and the second claw-shaped magnetic pole pieces respectively are alternately engaged;
    the electric rotating machine including:
    first magnetic flux adjusters configured to be provided on both side surfaces in the rotation direction of the first claw-shaped magnetic pole pieces to reduce the distance between the first claw-shaped magnetic pole pieces and the second claw-shaped magnetic pole pieces;
    second magnetic flux adjusters configured to be provided on both side surfaces in the rotation direction of the second claw-shaped magnetic pole pieces to reduce the distance between the first claw-shaped magnetic pole pieces and the second claw-shaped magnetic pole pieces;

a pair of first chamfers configured to be provided on both end sides in the rotation direction on the stator side surface of the first claw-shaped magnetic pole pieces; and a pair of second chamfers configured to be provided on both end sides in the rotation direction on the stator side surface of the second claw-shaped magnetic pole pieces;

wherein shapes of the first chamfer and the second chamfer adjacent to the inter-magnetic pole where the permanent magnet is inserted, are configured to be different from shapes of the first chamfer and the second chamfer adjacent to an inter-magnetic pole where the permanent magnet is not inserted; and shapes of the first magnetic flux adjuster and the second magnetic flux adjuster adjacent to the inter-magnetic pole where the permanent magnet is inserted, are configured to be different from shapes of the first magnetic flux adjuster and the second magnetic flux adjuster adjacent to the inter-magnetic pole where the permanent magnet is not inserted.

2. The electric rotating machine according to claim 1, wherein rotation direction widths of the first chamfer and the second chamfer adjacent to the inter-magnetic pole where the permanent magnet is inserted, are configured to be wider than rotation direction widths of the first chamfer and the second chamfer adjacent to the inter-magnetic pole where the permanent magnet is not inserted.

3. The electric rotating machine according to claim 2, wherein the rotation direction widths of the first chamfer and the second chamfer adjacent to the inter-magnetic pole where the permanent magnet is inserted, are configured to be wider than half of a radial width of a magnetic flux output surface of the permanent magnet.

4. The electric rotating machine according to claim 3, wherein the rotation direction widths of the first chamfer and the second chamfer adjacent to the inter-magnetic pole where the permanent magnet is not inserted, are configured to be narrower than half of the radial width of the magnetic flux output surface of the permanent magnet.

5. The electric rotating machine according to claim 1, wherein the rotation direction widths of the first magnetic flux adjuster and the second magnetic flux adjuster adjacent to the inter-magnetic pole where the permanent magnet is inserted, are configured to be wider than the rotation direction widths of the first magnetic flux adjuster and the second magnetic flux adjuster adjacent to the inter-magnetic pole where the permanent magnet is not inserted.

6. The electric rotating machine according to claim 2, wherein the rotation direction widths of the first magnetic flux adjuster and the second magnetic flux adjuster adjacent to the inter-magnetic pole where the permanent magnet is inserted, are configured to be wider than the rotation direction widths of the first magnetic flux adjuster and the second magnetic flux adjuster adjacent to the inter-magnetic pole where the permanent magnet is not inserted.

7. The electric rotating machine according to claim 3, wherein the rotation direction widths of the first magnetic flux adjuster and the second magnetic flux adjuster adjacent to the inter-magnetic pole where the permanent magnet is inserted, are configured to be wider than the rotation direction widths of the first magnetic flux adjuster and the second magnetic flux adjuster adjacent to the inter-magnetic pole where the permanent magnet is not inserted.

8. The electric rotating machine according to claim 4, wherein the rotation direction widths of the first magnetic flux adjuster and the second magnetic flux adjuster adjacent to the inter-magnetic pole where the permanent magnet is inserted, are configured to be wider than the rotation direction widths of the first magnetic flux adjuster and the second magnetic flux adjuster adjacent to the inter-magnetic pole where the permanent magnet is not inserted.

9. The electric rotating machine according to claim 1, wherein the radial width of the first magnetic flux adjuster and the second magnetic flux adjuster adjacent to the inter-magnetic pole where the permanent magnet is inserted, is configured to be wider than half of a radial width of a magnetic flux output surface of the permanent magnet.

10. The electric rotating machine according to claim 2, wherein the radial width of the first magnetic flux adjuster and the second magnetic flux adjuster adjacent to the inter-magnetic pole where the permanent magnet is inserted, is configured to be wider than half of the radial width of a magnetic flux output surface of the permanent magnet.

11. The electric rotating machine according to claim 3, wherein the radial width of the first magnetic flux adjuster and the second magnetic flux adjuster adjacent to the inter-magnetic pole where the permanent magnet is inserted, is configured to be wider than half of the radial width of the magnetic flux output surface of the permanent magnet.

12. The electric rotating machine according to claim 4, wherein the radial width of the first magnetic flux adjuster and the second magnetic flux adjuster adjacent to the inter-magnetic pole where the permanent magnet is inserted, is configured to be wider than half of the radial width of the magnetic flux output surface of the permanent magnet.

13. The electric rotating machine according to claim 5, wherein the radial width of the first magnetic flux adjuster and the second magnetic flux adjuster adjacent to the inter-magnetic pole where the permanent magnet is inserted, is configured to be wider than half of the radial width of a magnetic flux output surface of the permanent magnet.

14. The electric rotating machine according to claim 1, wherein a number of the inter-magnetic poles where the permanent magnet is inserted is configured to be same as that of the inter-magnetic poles where the permanent magnet is not inserted.

15. The electric rotating machine according to claim 1, wherein the inter-magnetic pole where the permanent magnet is inserted and the inter-magnetic pole where the permanent magnet is not inserted, are configured to be alternately arranged in the rotation direction.

* * * * *